(12) United States Patent
Kinjo

(10) Patent No.: US 7,224,851 B2
(45) Date of Patent: May 29, 2007

(54) METHOD AND APPARATUS FOR REGISTERING MODIFICATION PATTERN OF TRANSMISSION IMAGE AND METHOD AND APPARATUS FOR REPRODUCING THE SAME

(75) Inventor: Naoto Kinjo, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 794 days.

(21) Appl. No.: 10/308,183

(22) Filed: Dec. 3, 2002

(65) Prior Publication Data

US 2003/0112259 A1 Jun. 19, 2003

(30) Foreign Application Priority Data

Dec. 4, 2001 (JP) .............................. 2001-370316

(51) Int. Cl.
*G06K 9/36* (2006.01)
*G06K 9/00* (2006.01)
*H04Q 7/20* (2006.01)

(52) U.S. Cl. ........................ 382/276; 382/100; 455/466

(58) Field of Classification Search ................ 382/100, 382/118, 276; 345/473; 455/412.1, 412.2, 455/566, 466
See application file for complete search history.

(56) References Cited

U.S. PATENT DOCUMENTS

| 5,629,752 | A | | 5/1997 | Kinjo |
| 5,734,794 | A | * | 3/1998 | White ........................ 704/275 |
| 5,880,731 | A | * | 3/1999 | Liles et al. .................. 715/758 |
| 5,930,391 | A | | 7/1999 | Kinjo |
| 6,476,815 | B1 | | 11/2002 | Ando |
| 6,518,993 | B2 | * | 2/2003 | Kerai et al. ............... 348/14.01 |
| 6,885,761 | B2 | * | 4/2005 | Kage ........................... 382/118 |
| 6,943,794 | B2 | * | 9/2005 | Kamimura et al. .......... 345/473 |
| 6,990,452 | B1 | * | 1/2006 | Ostermann et al. ......... 704/260 |
| 2002/0015514 | A1 | | 2/2002 | Kinjo |
| 2002/0047905 | A1 | | 4/2002 | Kinjo |
| 2002/0194006 | A1 | * | 12/2002 | Challapali ................... 704/276 |

FOREIGN PATENT DOCUMENTS

| EP | 1 137 248 A2 | 9/2001 |
| JP | 8-122944 | 5/1996 |
| JP | 9-138471 | 5/1997 |
| JP | 10-171027 | 6/1998 |
| JP | 2000-123191 A | 4/2000 |

(Continued)

OTHER PUBLICATIONS

Japanese Abstract No. 2002-199362, dated Jul. 12, 2002.

(Continued)

*Primary Examiner*—Colin LaRose
(74) *Attorney, Agent, or Firm*—Sughrue Mion, PLLC

(57) ABSTRACT

The registering method and apparatus read out contents associated with a modification pattern modifying a transmission image to be displayed on a second image display unit of a second communication device when a first communication device including a first image display unit of a first person in communication is communicating with the second communication device of a second person in communication through a relay center, copy the modification pattern from the contents, and register the modification pattern in such a manner that the first person in communication or the first communication device is capable of using the modification pattern. The reproducing method and apparatus reproduce the registered modification pattern.

28 Claims, 9 Drawing Sheets

FOREIGN PATENT DOCUMENTS

| | | |
|---|---|---|
| JP | 2002-305717 | 10/2002 |
| WO | WO 99/37105 A2 | 7/1999 |

OTHER PUBLICATIONS

The technical report dated Nov. 18 and 19, 1999 of the Insititute of Electronics, Information and Communication Engineers, PRMU99-106 "Robust Gesture Recognition For Change of Gesture Position" Yoshimichi Amada, Motoyuki Suzuki, Hideaki Goto, Shozo Makino (Tohoku University).

PRMU99-138 "Automatic Extraction of Facial Organs and Recognition of Facial Expressions" Hiroshi Kobayashi, Hisanori Takahashi, Kohki Kikuchi (Science University of Tokyo).

PRMU99-139 "Detecting Human Face and Recognizing Facial Expressions & Using Potential Net" Hiroaki Bessho (Laboratories of Image Information Science and Technology), Yoshio Iwai, Masahiko Yaschida (Osaka University).

PRMU99-140 (Special Lecture) "Research on the Recognition of Facial Expressions of Emotion and the Image Processing Technology" Hiroshi Yamada (Nihon University/ATR).

PRMU99-142 (Special Invitation Thesis) "Human Motion Analysis and Recognition for Interaction" Masahiko Yachida, Yoshio Iwai (Osaka University).

"Nikkei Electronics", Sep. 23, 2002, pp. 169-178.

"Smartface—A Robust Face Recognition System under Varying Facial Pose and Expression" Osamu Yamaguchi, Kazuhiro Fukui (Toshiba Corporate Research and Develop Center), The Institute of Electronics, Information and Communication Engineers Transaction, D-11 vol. J84-D-II, No. 6 pp. 1045-1052, Jun. 2001.

Japanese Abstract No. 2000172589, dated Jun. 23, 2000.

* cited by examiner

FIG. 4

| REGISTERED CUSTOMER ID: × × × × | | REPRESENTATIVE: × × × × | | |
|---|---|---|---|---|
| MODE | MODIFICATION PATTERN IMAGE (IMAGE COMPOSITION PATTERN) (MAY BE PLURAL) | RELATIVE POSITION (NORMALIZED WITH FACE WIDTH) | SIZE (WITH FACE WIDTH AS REFERENCE) | ORIENTATION (WITH FACE AS REFERENCE) |
| IMPATIENCE | (face image) | BESIDE EYE $(x_1, y_1)$ | MAGNIFICATION 0.1 | LEFT-HAND SIDE |
| SURPRISE | (face image) | EYES $(x_2, y_2), (x_3, y_3)$ | 1.0 | ORIENTATION DETERMINATION RESULT |
| ANGER | (face image) | $(x_4, y_4)$ | . . . | . . . |
| SADNESS | (face image) | . . . | 0.5 | . . . |
| AFFLICTION | (face image) | . . . | . . . | . . . |
| AFFECTION | (face image) | . . . | . . . | . . . |
| GLADNESS | (face image) | . . . | . . . | . . . |
| . . . | . . . | . . . | . . . | . . . |

METHOD AND APPARATUS FOR REGISTERING MODIFICATION PATTERN OF TRANSMISSION IMAGE AND METHOD AND APPARATUS FOR REPRODUCING THE SAME

BACKGROUND OF THE INVENTION

1. Field of the Invention

The present invention relates to a method and an apparatus for registering a modification pattern of a transmission image in which, in order to enhance the amusement aspect during communication between communication devices such as mobile telephones each having an image display unit, a large number of modification patterns which are used in modifying a transmission image such as an image photographed or captured by the other party in communication including an image of a person being displayed on the image display unit and which include image information such as a modification image to be displayed after having been composed with the transmission image, voice information, a program for reproducing the image and voice information, for example for composing the modification image with the transmission image, and a program for processing the transmission image, are registered, for example, in a database at a relay center of a communication network through which communication devices are operatively connected or in a memory of a communication device such that a person in communication can freely use the modification patterns.

The present invention also relates to a method and apparatus for reproducing a modification pattern of a transmission image with which a registered modification pattern is reproduced in an image display unit of a communication device or in an image display device at a relay center, for example after having been composed with a transmission image for modification.

2. Description of the Related Art

Heretofore, as image supplying devices for providing an image for appreciation, there are a photograph (print) for reproducing a still picture, a movie (a projector and a screen) and a television (TV: Cathode Ray Tube (CRT)) for reproducing an image in the form of a moving picture, and the like. In recent years, a liquid crystal display (LCD) and a plasma display have been developed as image display devices, such as a television and a monitor of a computer, for displaying a moving picture or a still picture, and various image display devices such as an electronic paper have been also developed as image display devices for a still picture. In addition, at the present time, the above-mentioned various image display devices can display not only an image such as a moving picture or a still picture but also character information.

Then, recently, these image display devices, in particular, LCDs are utilized not only as a simple monitor for televisions or computers, but also as an image display unit for cameras, telephones, various communication equipment, domestic electric appliances, other household products, or industrial products because those of various sizes have become available.

In addition, an image capturing apparatus such as a video camera, a digital camera, or a digital video movie, or communication equipment such as a fixed telephone, a portable telephone, a visual telephone, a mobile telephone, a movable telephone, or a mobile visual telephone is adapted to take therein voice together with an image and character information, and also is adapted to display the image and character information taken in the above-mentioned image display unit.

In particular, some of the mobile telephones each having an image display unit have an image capturing function and are adapted to display an image of a person in communication on an image display unit of the mobile telephone of the other party in communication during the call or character communication between the mobile telephones concerned.

However, while the above-mentioned conventional image capturing apparatus or communication equipment can capture an image, carry out communication, communicate character information, and also communicate and record voice as well, it simply reproduces the taken-in voice data in the form of voice as it is. Also, it aims at reproducing the captured image or the received image or character information as it is as faithfully as possible, and hence there is a problem in that no amusement aspect is taken into consideration at all.

SUMMARY OF THE INVENTION

The present invention has been made in order to solve the above-mentioned problem associated with the prior art, and therefore a first object of the present invention is to provide a method and an apparatus for registering a modification pattern of a transmission image in which, in order to enhance the amusement aspect during communication between communication devices such as mobile telephones each having an image display unit, a large number of modification patterns which are used in modifying a transmission image such as an image photographed captured by the other party in communication including an image of a person being displayed on the image display unit and which include a modification image to be displayed after having been composed with the transmission image and voice, to be more specific, a modification image to be displayed after having been additionally composed with an image of a person to represent information corresponding to a feeling of the person or communication contents, and voice, as well as a processing program for composing the modification patterns and a program for processing the transmission image, can be registered, for example, in a database at a relay center of a communication network through which communication devices are operatively connected or in a memory of a communication device such that a person in communication can freely use the modification patterns and a large assortment of the modification patterns dedicated to the person concerned can be kept.

A second object of the present invention is to provide a method and an apparatus for reproducing a modification pattern of a transmission image with which a registered modification pattern can be reproduced as desired in an image display unit of a communication device or in an image display device at a relay center, for example after having been composed with a transmission image for modification.

A third object of the present invention is to provide an method and an apparatus for registering a modification pattern of a transmission image, and a method and an apparatus for reproducing the modification pattern of the transmission image, these methods and apparatuses enhancing pleasure of creating an original modification pattern for modifying an image by making the contents to be emphasized visual in correspondence with a kind of feeling of a person in the transmission image such as an image photographed or captured by a person in communication, and in particular, in an image of a person, while being capable of readily registering depending on the preference a modification pattern which can enhance the amusement aspect of an image displayed on an image display unit during communication between communication devices and also of reproducing as desired a registered modification pattern.

In order to attain the first and third objects described above, the first aspect of the present invention provides a method of registering a modification pattern of a transmission image, comprising the steps of reading out contents associated with the modification pattern modifying the transmission image to be displayed on a second image display unit of a second communication device when a first communication device including a first image display unit of a first person in communication is communicating with the second communication device including the second image display unit of a second person in communication through a relay center, copying the modification pattern from the thus readout contents, and registering the thus copied modification pattern in such a manner that the first person in communication or the first communication device is capable of using the modification pattern.

Preferably, the modification pattern includes image information, voice information or both and a program that reproduces the image information, the voice information or both, or a program that processes the transmission image.

And, preferably, the modification pattern modifies a related image related to the first person in communication within the transmission image.

Further, preferably, the copied modification pattern is registered in a database of the relay center or in a first memory of the first communication device in association with related information related to the first person in communication or to the first communication device.

Further, preferably, the contents include a transmission image from the second communication device, which is displayed on the first image display unit of the first communication device communicating with the second communication device, and the copied modification pattern is a modification pattern modifying the transmission image from the second communication device, that is reproduced and displayed on the first image display unit of the first communication device communicating with the second communication device.

In addition, preferably, the contents include a transmission image from the second communication device which is displayed on the first image display unit of the first communication device communicating with the second communication device, and the copied modification pattern is a modification pattern modifying the transmission image from the second communication device that is reproduced and displayed on the first image display unit of the first communication device communicating with the second communication device and is registered in a database of the relay center or in a first memory of the first communication device, or is transmitted from the relay center to the first communication device to be registered in the first memory in association with related information related to the first person in communication or to the first communication device.

Preferably, the modification pattern is registered in advance in the form of modification pattern data in association with the related information in the database of the relay center, an identification number of the reproduced modification pattern is added to the transmission image displayed on the first image display unit, the first communication device cuts out the identification number of the modification pattern from the transmission image displayed on the first image display unit to transmit copy request data containing the thus cut-out identification number of the modification pattern to the relay center, and the relay center that has received the copy request data retrieves the modification pattern which is registered in the database in advance in association with the related information related to the second person in communication or to the second communication device from the identifying number of the modification pattern to add and register the thus retrieved modification pattern into the database in association with the related information related to the first person in communication or to the first communication device.

And, preferably, the copied modification pattern is counted whenever it is copied or used, and the possessor of the second communication device receives an offer of service in correspondence to the number of counts.

Preferably, the modification pattern is registered in advance in the form of modification pattern data in the second memory, an identification number of the reproduced modification pattern is added to the transmission image displayed on the first image display unit, the first communication device cuts out the identification number of the modification pattern from the transmission image displayed on the first image display unit to transmit copy request data containing the identification number of the thus cut-out modification pattern to the second communication device, the second communication device that has received the copy request data reads out the modification pattern registered in the second memory from the identification number of the modification pattern to send the thus read out modification pattern data back to the first communication device, and the first communication device adds and registers the modification pattern data thus received into the first memory.

Preferably, the modification pattern is used to be composed with the related image to be displayed in the form of the transmission image in order to modify the related image related to the first person in communication within the transmission image, and the copied modification pattern is a modification pattern composed within the transmission image from the second communication device, which is displayed on the first image display unit of the first communication device communicating with the second communication device.

Preferably, the contents include a picture scene televised to an image display device and viewed by the person in communication, and the copied modification pattern is predetermined picture information, voice information or both within the picture scene being viewed by the first person in communication and a reproducing program therefor.

And, preferably, the contents include a picture scene televised to an image display device and viewed by the first person in communication, the copied modification pattern is picture information, voice information or both of a special effect scene within a televised image of the picture scene viewed by the first person in communication and a reproducing program therefor, and is registered in a database of the relay center or in a first memory of the first communication device in association with the related information related to the first person in communication or to the first communication device.

Preferably, the modification pattern is registered in advance in the form of modification pattern data in the database of the relay center in association with the related information or in a database of a resource of the televised image, an identification number of a scene frame is added to the televised image in the image display device, copy request data containing the identification number of the scene frame is transmitted from the first communication device to the resource which supplies the televised image to the image display device, and the resource that has received the copy request data retrieves the televised image of the special effect scene with the identification number of the scene frame to add and register the modification pattern in the televised image of the special effect scene thus retrieved in the form of the modification pattern into the database of the relay center in association with the related information related to the first person in communication or to the first communication device.

Preferably, the modification pattern is registered in advance in the form of modification pattern data in the database of the relay center in association with the related information or in the form of modification pattern data in a database of a resource of the televised image, an identification number of a scene frame is added to the televised image in the image display device, copy request data containing the identification number of the scene frame is transmitted from the first communication device to the relay center, the relay center that has received the copy request data transmits the copy request data to the resource, and the resource that has received the copy request data retrieves the televised image of the special effect scene with the identification number of the scene frame to add and register the modification pattern in the televised image of the special effect scene thus retrieved in the form of the modification pattern into the database of the relay center in association with the related information related to the first person in communication or to the first communication device.

Preferably, the modification pattern is used to be composed with the related image to be displayed in the form of the transmission image in order to modify the related image related to the first person in communication within the transmission image, and the copied modification pattern is a modification pattern for the televised image of the special effect scene televised to the image display device.

Preferably, the contents include a picture recording medium viewed by the first person in communication, and the copied modification pattern is picture information, voice information or both within a reproduced picture reproduced from the picture recording medium and viewed by the first person in communication and a reproducing program therefor.

And, preferably, the picture recording medium is a picture data recording medium on which at least the picture information is recorded in the form of picture data, and the modification pattern is recorded on the picture data recording medium in the form of modification pattern data and is copied from the picture data recording medium or is copied from an accessing destination by using identification information of the accessing destination recorded on the picture data recording medium.

Preferably, the picture recording medium is a hardcopy medium to display at least the picture information in the form of hardcopy image and contains the picture information of the modification pattern and its identification information, and the modification pattern is copied from a predetermined accessing destination in the form of modification pattern data by using the identification information of the modification pattern displayed on the hardcopy medium.

And, preferably, the modification pattern is copied from the predetermined accessing destination at the relay center side based on the identification information of the modification pattern which is transmitted from the first communication device to the relay center, and is registered into the database of the relay center in association with the first person in communication.

Preferably, the related image is a captured image of the first person in communication, and the modification pattern represents a kind of feeling which is determined based on at least one kind of information selected from an expression and a gesture of the first person in communication extracted from the captured image, and voice data attached to the captured image.

And, preferably, the first and second communication devices are each a communication device having an image photographing function.

Furthermore, in order to attain the first and third objects described above, the second aspect of the present invention provides an apparatus for registering a modification pattern of a transmission image, comprising reading means for reading out contents associated with a modification pattern modifying the transmission image to be displayed on a second image display unit of a second communication device when a first communication device including a first image display unit of a first person in communication is communicating with the second communication device including the second image display unit of a second person in communication through a relay center, copying means for copying the modification pattern from the contents read out by the reading means, and storing means for registering and storing the modification pattern copied by the copying means in such a manner that the first person in communication or the first communication device is capable of using the modification pattern.

Preferably, the storing means is a database of the relay center or a first memory of the first communication device to store the copied modification pattern in association with the related information in related to the first person in communication or to the first communication device thereof.

And, preferably, the registering apparatus is a server of the relay center or the first communication device.

Further, preferably, the communication device is a mobile telephone having an image photographing function.

Further, in order to attain the second and third objects described above, the third aspect of the present invention provides a method of reproducing a modification pattern of a transmission image, comprising the steps of reading out contents associated with the modification pattern modifying the transmission image to be displayed on a second image display unit of a second communication device when a first communication device including a first image display unit of a first person in communication is communicating with the second communication device including the second image display unit of a second person in communication through a relay center, copying the modification pattern from the thus read out contents, registering the thus copied modification pattern in such a manner that the first person in communication or the first communication device is capable of using the modification pattern, reading out by the first communication device the modification pattern registered by means of the registering step, and reproducing and displaying the readout modification pattern on the first image display unit of the first communication device, the second image display unit of the second communication device or an image display device of the relay center.

Preferably, the transmission image transmitted from the first communication device and displayed on the second image display unit of the second communication device is modified by the modification pattern to be displayed.

Furthermore, in order to attain the second and third objects described above, the fourth aspect of the present invention provides an apparatus of reproducing a modification pattern of a transmission image, comprising first reading means for reading out contents associated with a modification pattern modifying the transmission image to be displayed on a second image display unit of a second communication device when a first communication device including a first image display unit of a first person in communication is communicating with the second communication device including the second image display unit of a second person in communication through a relay center, copying means for copying the modification pattern from the contents read out by the reading means, storing means for registering and storing the modification pattern copied by the copying means in such a manner that the first person in communication or the first communication device is capable of using the modification pattern, second reading means for reading out the modification pattern registered by the storing means and provided in the first communication device, and reproducing means for reproducing and displaying the read-out modification pattern on the first image display unit of the first communication device, the second image display unit of the second communication device or an image display device of the relay center.

Preferably, the second communication device displays the transmission image modified by the modification pattern and transmitted to the second image display unit thereof from the first communication device.

BRIEF DESCRIPTION OF THE DRAWINGS

In the accompanying drawings:

FIG. 4 is a diagram useful in explaining an example of an image modification pattern and an image composition pattern used in the present invention;

DETAILED DESCRIPTION OF THE PREFERRED EMBODIMENTS

Figure 1:
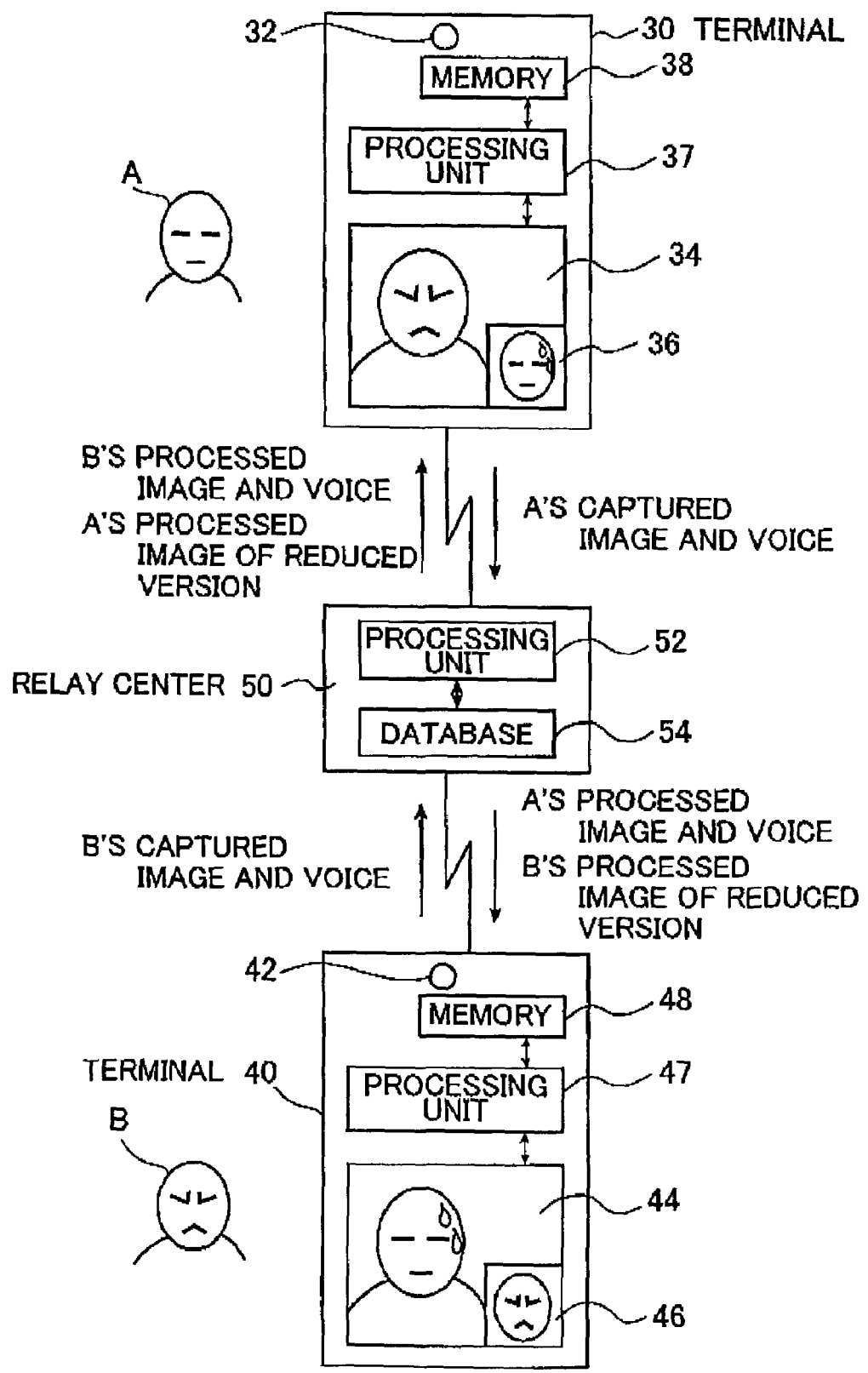
FIG. 1 is a block diagram showing the outline of an embodiment of a mobile visual telephone system to which the present invention is applied.

The method and apparatus for registering a modification pattern of a transmission image and the method and apparatus for reproducing the same according to the first to fourth aspects of the present invention will be described below in detail with reference to the preferred embodiments shown in the accompanying drawings.

First of all, the present invention is basically capable of readily registering a modification pattern to be included in a transmission image for modifying a related image such as an image photographed or captured by a person in communication including an image of a person (e.g., a modification pattern (image processing pattern) including a modification image for representing the contents of communication, the contents of a call, or a feeling of the person in communication, a program for displaying the modification image in the form of a composite image with the transmission image or related image, and a program for processing the transmission image), for example in a database at a relay center for communication devices or in a memory of a communication device in the form enabling the person in communication to access freely such that the related image such as an image photographed or captured (hereinafter, generically referred to as "captured") by the person in communication including an image of a person can be displayed in the form of the transmission image on an image display unit of a communication device of the other party in communication during the communication or the call between the communication devices such as telephones each having the image display unit with enhanced amusement aspect in the communication or the call. The present invention is also capable of readily reproducing and displaying the modification pattern described above in an image display unit of a communication device or an image display device at a relay center as desired.

When a modification pattern is registered in the present invention, the modification pattern is acquired from contents including various modification patterns, as exemplified by a transmission image sent from the other party in communication after having been modified with a modification pattern, a television image from which a special effect scene or other modification patterns can be acquired, an image delivered through the Internet, a video data recording medium such as a DVD onto which modification patterns are recorded, and a hard copy medium such as a magazine which includes modification images of modification patterns and from which image processing patterns of the modification images can be acquired, and the thus acquired modification pattern is then copied and registered in the form enabling a person in communication to access freely.

Note that the present inventor proposed in U.S. Ser. No. 09/833,784 a method of determining or selecting a modification pattern (image processing pattern) by which a related image such as an image captured by a person in communication including an image of a person is composed, in particular, a-method of selecting a modification pattern representing a feeling of a person in communication from the contents of communication or the contents of a call, a method of composing a related image such as an image captured by a person in communication including an image of a person with a determined or selected modification image of a modification pattern, a method of image-processing a related image based on a selected modification pattern, and a method of registering in advance initially produced modification patterns representing feelings of a person in communication and the like such that a modification pattern of interest can be selected, these methods constituting the presupposition of the present invention.

According to each of the methods thus proposed, a person in communication can enjoy a modification pattern of a transmission image of the other party in communication which is displayed on an image display unit of his/her communication device during a call or communication, in other words, a displayed image (modification image) resulting from the modification pattern. He/she selects a modification pattern of a transmission image to be transmitted to the other party in communication from among previously prepared modification patterns. However, since the modification pattern of a transmission image refers not only to modification image information (image data) and modification voice information (voice data) for modifying the transmission image but also to a program for composing the image and voice information with the transmission image and a program for subjecting the transmission image to image processing and voice processing using the image and voice information (data), he/she needs to produce modification patterns by himself/herself for the previous preparation of modification patterns, which is laborious. Furthermore, in the case where even if modification patterns are prepared in advance, there is no modification pattern suitable for a transmission image, there is need for selecting any one of producing newly a modification pattern, substituting a similar modification pattern or a related modification pattern therefor, or stopping composition of a related image with a modification image of a modification pattern. Thus, this selection takes time so that it is not in time for the communication which is made in real time, the amusement aspect is reduced or lost. Then, in order to enhance the amusement aspect, there is need for keeping a rich assortment of modification patterns for his/her transmission image in advance. In order to attain this, however, as described above, he/she needs to produce modification patterns by himself/herself, and hence it takes time.

For this reason, the first and second aspects of the present invention provide a method and an apparatus for registering a modification pattern of a transmission image, respectively, with which a large assortment of modification patterns can be easily stocked for his/her transmission image. The third and fourth aspects of the present invention provide a method and an apparatus for reproducing a modification pattern of a transmission image which are capable of easily selecting a modification pattern suitable for a transmission image as desired or depending on the preference from a large assortment of modification patterns for transmission image having been registered by the registration method and apparatus described above.

Here, the method of determining or selecting a modification pattern, the method of composing the related image with a determined or selected modification pattern, and the method and apparatus for registering modification patterns for selection all of which constitute the presupposition of the present invention are described in U.S. Ser. No. 09/833,784. These methods and apparatus will be first described below.

These methods constituting the presupposition of the present invention are basically intended to enhance the amusement aspect in image expression such as image display which is made in real time in a visual telephone, a mobile visual telephone or the like by determining a kind of feeling of a person in a captured image scene from voice data attached to the captured image scene and modifying an image of the person concerned with a modification pattern emphasizing the feeling corresponding to the kind of feeling concerned, for example adding or composing a modification image (e.g., a mark) to or with an image of the person concerned. In the following, an image processing pattern for composing a modification image such as a mark on an image being displayed will be described as a typical example of the modification pattern by reference to a typical mobile visual telephone system through which the image communication can be made and in which the method of the present invention can be implemented (hereinafter referred to as "a mobile visual telephone system"). However, this is not the sole case of the present invention.

FIG. 1 is a schematic block diagram explaining one embodiment of a mobile visual telephone system in which the method of the present invention can be implemented.

The mobile visual telephone system shown in FIG. 1 comprises mobile visual telephone terminals (hereinafter, simply referred to as "terminals") 30 and 40 having image display units 34 and 44, respectively, and a relay center (more specifically a communication control unit in a relay service provider) 50 for mobile visual telephones through which these terminals are operatively connected.

Note that the relay center 50 in this embodiment is provided with not only the communication control unit (communication control unit of a relay service provider) for relaying and controlling the communication between the terminals 30 and 40 but also an image processing unit for executing the image composition processing of the present invention.

In the mobile visual telephone system, the terminals 30 and 40 comprise image sensors 32 and 42, the image display units 34 and 44, display frames for confirmation 36 and 46, processing units 37 and 47, and memories 38 and 48, respectively.

The relay center 50 comprises a processing unit 52 and a database 54.

In this embodiment, image composition processing which is a modification pattern for each image displayed on the image display unit 34 or 44 is carried out on the side of the relay center 50 for mobile visual telephones. The image composition processing will be described later.

In this embodiment, face image data (an expression for each mode used for determining a mode corresponding to a kind of feeling) for each user (person in communication), voice data (a keyword for extracting any one of modes) and modification patterns in modes are registered in advance in the database (server) 54 of the relay center 50 of a communication provider through the terminals 30 and 40.

Note that, selection and registration of the face image data, the voice data and the modification patterns in modes will be described later.

During the communication, as shown in FIG. 1, an image captured by a person A in communication with the image sensor 32 and voice of the person A in communication, and an image captured by the other party B in communication with the image sensor 42 and voice of the other party B in communication are transmitted to the relay center 50 from the terminal 30 of the person A in communication and from the terminal 40 of the other party B in communication, respectively.

In the processing unit (server) 52 of the relay center 50, data of faces is usually extracted from the captured images of the person A in communication and the other party B in communication to be matched with data of registered expressions and also to check whether or not a registered keyword is included in calling voice.

Then, for example, when an impatience mode is detected from conversation of the person A in communication, the processing for composition of the related image with, for example, a sweat mark as a modification pattern (which will be described later) is executed for the image captured by the person A in communication and the processed image is transmitted as a transmission image to the terminal 40 of the other party B in communication. In addition, at this time, the reduced version of the processed image of the person A in communication may also be transmitted to the terminal 30 of the person A in communication for confirmation. The face image of the other party B in communication is displayed on the display screen of the image display unit 34 of the terminal 30 of the person A in communication. Then, the display frame 36 is provided in the corner of the image display unit 34 for confirmation of the processed image of the person A in communication and the processed image of the person A in communication is displayed within the display frame 36. At this time, the processed image of the person A in communication is displayed on the display screen of the image display unit 44 of the terminal 40 of the other party B in communication, and the reduced version of the processed image of the other party B in communication which has been sent from the relay center 50 is also displayed within the display frame 46 provided in the corner of the image display unit 44 for confirmation, which is as in the above.

The face image data for each user, the voice data and the modification patterns, and the image composition patterns in this embodiment may be registered in a terminal of the user concerned (refer to FIG. 4) so that the image composition processing can be executed on the side of the terminal of a mobile visual telephone based on the mode detection. Alternatively, the above-mentioned data may be stored in both of the relay center and the terminal to allow the processing to be executed in either side.

In addition, as will be described later, the image composition processing is not limited to the case of the transmission. Hence, the composition processing may be applied to the received voice/image data. For example, in FIG. 1, the composition processing for the image received from the other party B in communication may also be executed in the terminal of the person A in communication. In this case, addition of the modification pattern preferred by the person A in communication as the reception side enhances the amusement aspect.

Next, the description will hereinafter be given with respect to the method of selecting a modification pattern for a captured image to execute composition processing using the selected modification pattern.

First of all, in this embodiment, a modification pattern corresponding to voice data is, for example, selected or produced for a still picture such as an image captured with the terminal 30 or 40 having the image capturing function as in the image sensor 32 or 42 and attached to the voice data as accessory information, and the image composition processing using a selected modification pattern is executed on the captured image.

Figure 2:
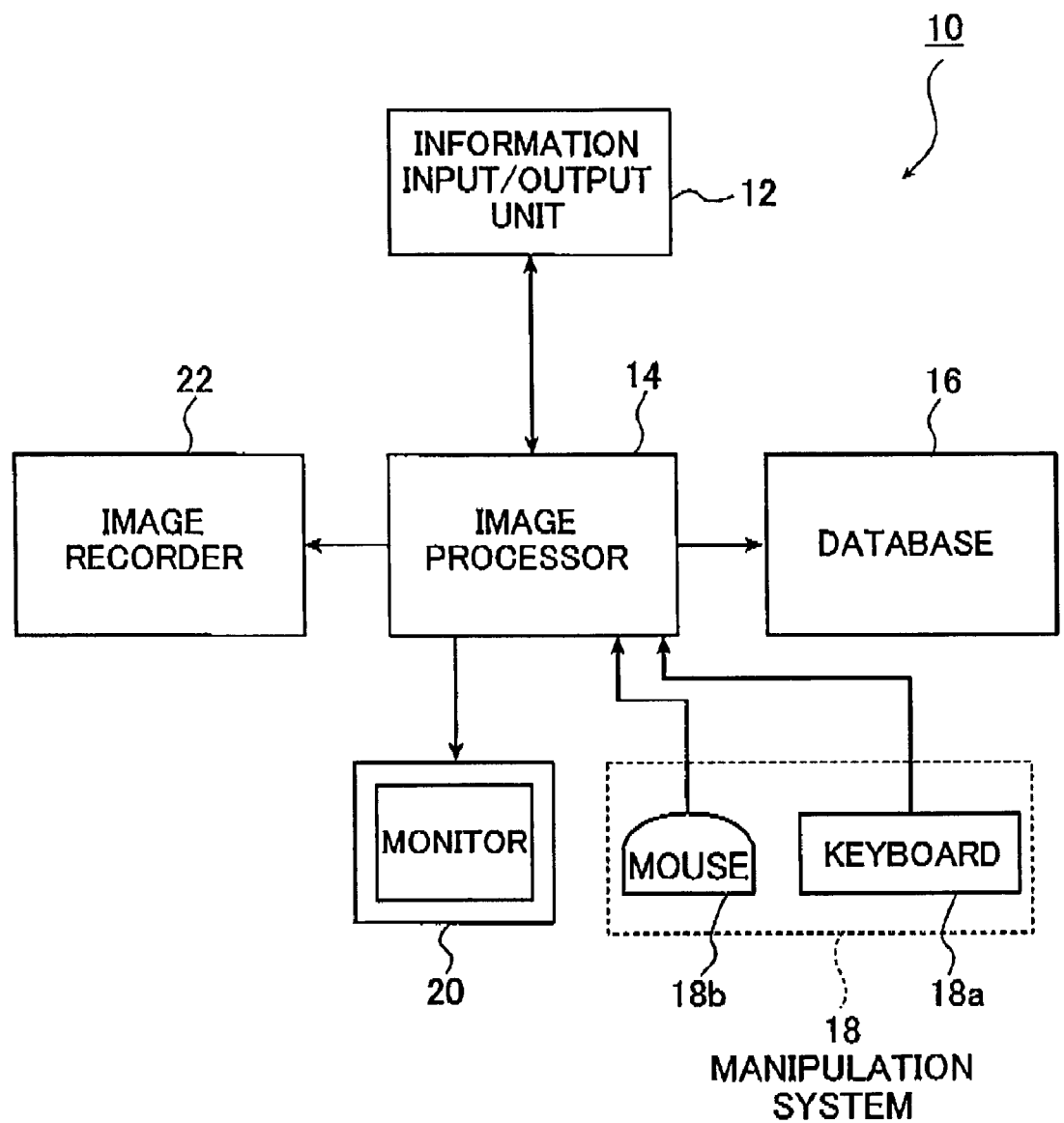
FIG. 2 is a block diagram showing the outline of an embodiment of a device for selection and composition of a modification pattern including an image processor implementing an image composition processing method which is implemented in the mobile visual telephone system shown in FIG. 1.

FIG. 2 is a block diagram showing the outline of an apparatus for performing selection and composition processing on a modification pattern containing an image processor in which an image composition processing method according to this embodiment is implemented. An apparatus 10 for performing selection and composition processing of a modification pattern shown in FIG. 2 (hereinafter, simply referred to as "a selection/composition apparatus") is installed in the relay center 50, or is operatively connected thereto, and includes mainly an information input/output unit 12, an image processor 14 and a database 16.

Now, the image processor 14 and the database 16 can be used as the processing unit 52 and the database 54 shown in FIG. 1, respectively.

The image processor 14 implements the image composition processing method which is applied to the present invention and other various image processing. In addition, a manipulation system 18 having a keyboard 18a and a mouse 18b for inputting or setting various image processing conditions, selecting and commanding a specific processing step and entering a command and so forth for effecting color/density correction, and a monitor 20 for displaying the image inputted through the information input/output unit 12, various manipulative commands and pictures for setting and registering various conditions are operatively connected to the image processor 14. Here, the composed image of a captured image with a modification image of a modification pattern (hereinafter referred to as "a modification pattern image") that has been obtained in the image processor 14 for confirmation is also displayed on the monitor 20. An image recorder 22 which outputs a (finished) image as a print by imagewise exposing a photosensitive material (photographic paper) to light beams modulated in accordance with the image data delivered from the image processor and developing the exposed photosensitive material may be connected to the image processor 14.

The information input/output unit 12 is an interactive transmission and reception unit in which image data and voice data transmitted to the relay center after having been captured with the terminal 30 or 40 is acquired and then sent to the image processor 14 and a composite image of a captured image with a modification pattern which has been composed in the image processor 14 is received and then transmitted to the terminal 30 or 40.

The database 16 stores a plurality of modification patterns for use in modification (composition processing in this case) of a captured image performed in the image processor 14 in a predetermined customer area (specified by customer identification information or a customer ID) together with predetermined modification pattern identification information (an ID code or an ID number) attached thereto. For example, a plurality of modification patterns can be stored in the form of a table as shown in FIG. 4.

Note that the information input/output unit 12 is not limited to the unit for transmitting and receiving the voice data and the image (the captured image and the composite image) data during the communication between the terminals 30 and 40. Thus, when performing production of new modification patterns, registration or addition of these new modification patterns in or to the database, setting or confirmation of the conditions of the composite patterns for the composition of captured images with these new modification pattern images and their registration or addition in or to the database, the information input/output unit 12 is preferably adapted to read out the voice data and the captured image data obtained by the image capturing apparatus with a sound recording function such as a digital camera with a voice recording function from recording media or the like.

Figure 3:
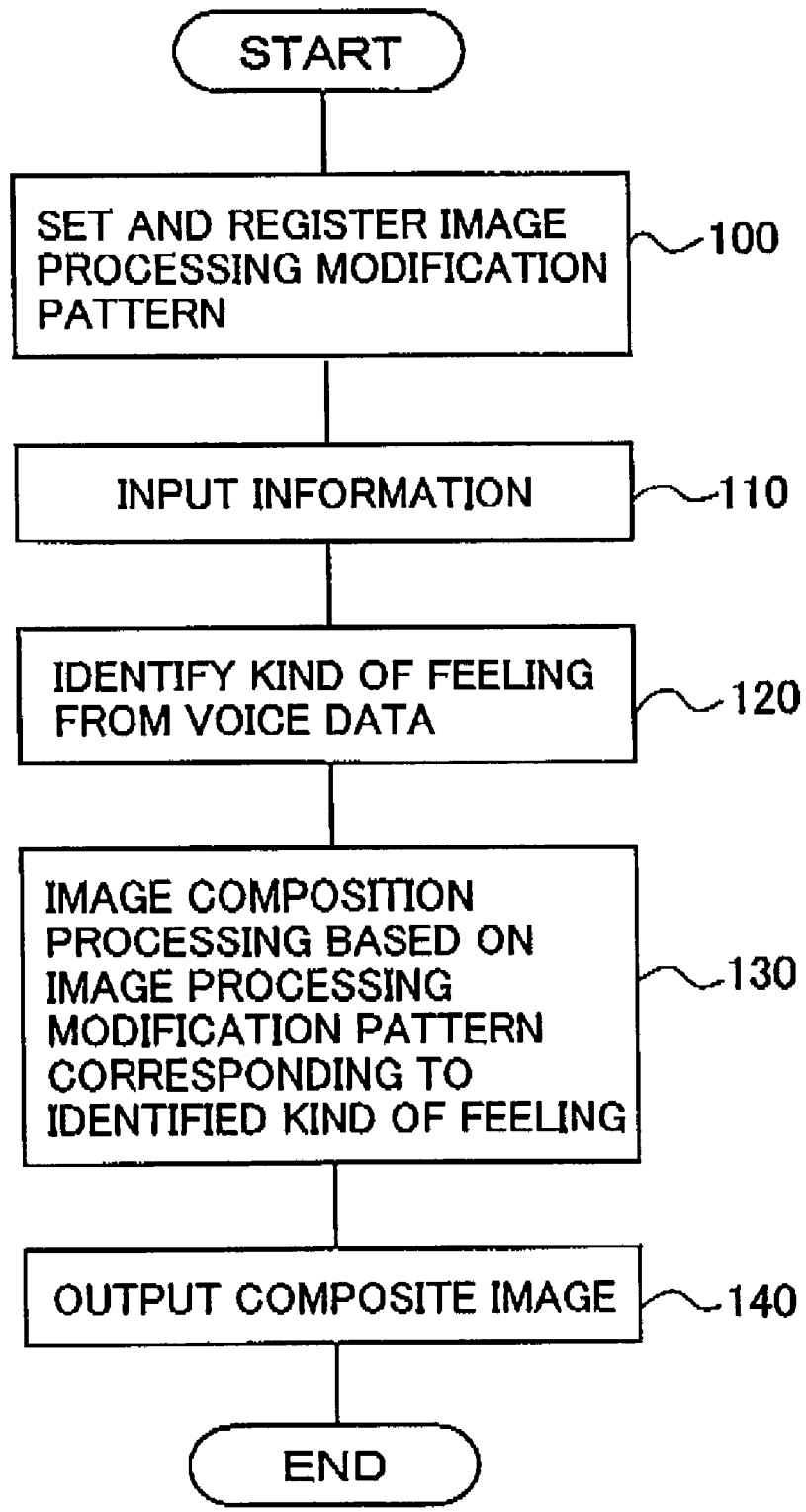
FIG. 3 is a flow chart useful in explaining an example of a processing flow of the image composition processing method which is implemented in the device for selection and composition of a modification pattern shown in FIG. 2.

The image composition processing of modification images by modification patterns will be described below with reference to a flow chart shown in FIG. 3.

First of all, as the presupposition, in Step 100, modification patterns (i.e., modification images and image composition patterns) corresponding to the various kinds of feelings are registered in advance in the database 16. However, there are a great variety of feelings of a human being, and hence it is impossible to handle all of the feelings. Thus, in this case, only the typical feelings which relatively clearly appear are handled.

FIG. 4 shows one example of the setting of modification patterns (modification images and image composition patterns) and their registration in the database 16. As shown in the column MODE of FIG. 4, the kinds of feelings which are handled in this case are "IMPATIENCE", "SURPRISE", "ANGER", "SADNESS", "AFFLICTION (DOUBT)", "AFFECTION", "GLADNESS", and the like.

In this embodiment, the kind of feeling is determined on the basis of the voice data (voice information) attached to the captured image scene. In addition, the captured image is composed with a modification image (mark) which may emphasize the feeling for each kind of feeling according to the modification pattern or image processing pattern applied. Thus, setting of the modification pattern (image composition pattern) corresponding to a kind of feeling finally means setting of the modification pattern (image composition pattern) corresponding to the specific voice information.

That is, items to be set in advance include modes representing kinds of feelings, words (keywords; omitted in the table shown in FIG. 4) extracting the individual modes, and image composition patterns corresponding to the individual modes. The modification patterns (image composition patterns) include modification images (marks) to be composed, position at which the composition is to be performed (relative position with respect to the face position in an image), size of a composite image, orientation of a composite image with respect to a face, and the like.

Now explaining about the modification pattern image column in the table as shown in FIG. 4, the images in the cells of the column show the results of the processing with modification patterns.

For instance, in the case of the "IMPATIENCE" mode, the face part is the captured image of the face of a person in communication and only the part of sweat is the modification image (mark) of a modification pattern. This is also the case with other modes, that is to say, modification images (marks) are shown as parts other than face parts.

In the following, the image composition processing with a modification image (mark) which emphasizes the feeling determined on the basis of the voice data attached to the captured image scene is described in detail.

When, for example, the keywords such as "uut (ow)", "yabai (chickie)", and "yabat (zex)" are contained in the voice information, "IMPATIENCE" mode corresponds thereto, and the image of a person is composed with the "sweat mark" as a result of the processing with the modification pattern. The number of composite images is not limited to one, and hence a plurality of composite images may be used. In addition, the composition position is specified by the relative position with respect to the position of a face in an image and is normalized with the face width. The size of the composite image is also specified on a face basis. In addition, the orientation in which a composite image is to be produced is also set on the basis of a face of a person in an image.

For example, in the case shown in FIG. 4, the two sweat marks (the two marks constituting one set) are composed with the captured image on the left-hand side of a face in such a way that its central coordinates (with eyes as the origin) are in the lateral position (x1, y1) with respect to eyes, and the size is 0.1 when the face width is assumed to be 1.

In addition, when the keyword such as "uhyoo (whoof)", "hyee (jiminy)", or "bikkurii (amazing)" is contained in the voice information, the "SURPRISE" mode corresponds thereto, and "marks of eyes which are projected due to surprise" are composed in such a way that their central coordinates are respectively (x2, y2) and (x3, y3). In addition, the term "orientation determination result" in FIG. 4 means that a pattern is composed in which the direction of projection of eyes is changed in accordance with the result obtained by determining according to the pattern matching technique or the like whether the orientation of the face of a person with respect to a camera is the front, oblique in the right-hand side, or oblique in the left-hand side.

In addition, when the keyword such as "samui (cold)" or "sabut (chilly)" is contained in the voice information, "SADNESS" mode corresponds thereto. Then, "shadow (slant line) mark" is added to a face, and "dead leaf mark" is composed in the periphery. At this time, instead of drawing slant lines in a face, a face color may be made white (pale). Furthermore, the background may be made monotonous to make the situation more melancholic. In addition, when there is a word such as "uun (Mmm)" or "eeto (well)", "AFFLICTION (DOUBT)" mode is applied to use "question mark" in composition. When there is a word such as "uffuun (aah)" or "suki (love)", "AFFECTION" mode is applied to use "heart" in composition. Also, when there is a word such as "waai (yahoo)" or "yattaa (made it)", "GLADNESS" mode is applied to use "fireworks" in composition. A certain number of image processing patterns may be prepared on the side of the system so that data produced by a customer can be thereafter added thereto. At this time, the word which a customer always says may be set as the word used to extract a mode and composite images or keywords for various feeling modes may also be registered on the basis of a taste of a customer.

The setting of the image processing patterns (modification patterns) as described above is made once prior to each image composition processing, and the modification patterns (image composition patterns in this case) thus set need only be registered in a predetermined customer area (i.e., a predetermined area specified by customer identification information) in the database 16 together with identification information attached thereto.

Next, in Step 110, information containing the voice data and the image capturing data attached as the accessory information is inputted to the information input/output unit 12. The voice data and the image data of the information thus inputted are respectively sent to the image processor 14.

Next, in Step 120, in the image processor 14, the kind of feeling is identified based on the voice data. To this end, the voice data is first recognized to perform matching as to whether a keyword leading to the mode representing the registered kind of feeling is contained therein. When a specific keyword is detected from the voice data, a modification pattern which is a specific image processing pattern is identified on the basis of the mode corresponding to that keyword.

In next Step 130, the modification pattern (image processing pattern) having been identified in Step 120 is used to execute the composition processing on the captured image. In other words, the captured image is composed with a modification image. At this time, the data of a face of a person is extracted from the captured image by a well-known method. An example of the method of extracting the data of a face is a method disclosed in commonly assigned JP 08-122944 A. In addition to this, the method of extracting a specific area such as a face area of a person is disclosed in JP 04-346333 A, JP 05-158164 A, JP 05-165120 A, JP 06-160993 A, JP 08-184925 A, JP 09-101579 A, JP 09-138470 A, JP 09-138471 A, JP 09-146194 A, and JP 09-197575 A. These methods can be also used with advantage.

After extraction of data of a face of a person from the captured image, the data of eyes is extracted from the data of the face, and then the width of the face, the positions of the eyes, and the like are calculated. Then, the captured image is composed with the modification pattern image on the basis of these data in accordance with the position, the size and the orientation which were identified in the modification pattern (image processing pattern).

When there is also another instruction such as changing the background or the color of the whole screen, the corresponding processing is executed. Thereafter, ordinary image processing is executed to produce an output image.

Note that, when a kind of feeling is determined only from the voice data as described above, the extraction of data of a person from the captured image is not necessarily required. On the other hand, when the kind of feeling is determined from an expression or a gesture of a person, or the voice data and an expression or a gesture of a person, it is necessary to extract data of a person from the image. In addition, even if it is unnecessary to extract data of a person from the image for the determination of a feeling, when the captured image is composed with a modification image according to a modification pattern applied, it is generally necessary to extract data of a person. However, when the modification pattern includes changing the background, changing the color of the whole screen, or in particular, placing dead leaves without taking their positions in account for example, extraction of data of a person is not particularly necessary. The extraction of data of a person from the image need only be carried out as required. To this end, for example, a method of determining a kind of feeling or the like can be preferably selected and set in advance.

Thus, in the image processor 14, the composite image is obtained from the captured image and a modification image of a modification pattern through the image composition processing. However, the composite image may be displayed on the monitor 20 for confirmation, or the composite image (print) may be outputted from the image recorder 22 during the confirmation on the monitor 20 or during the access to the database 16 for confirming the registration. The composite image print may be delivered to a customer.

Finally, in Step 140, the composite image obtained by executing the image composition processing in the image processor 14 according to a modification pattern is outputted to the information input/output unit 12 from which the composite image is then transmitted to the terminal 40 or 30 of the other party in communication together with the voice data.

Note that, while in the above-mentioned embodiment, the image processing is executed in the selection/composition apparatus 10 which is installed in or operatively connected to the relay center 50 on the side of the relay center 50 to produce the composite image which is the captured image composed with the mark (modification pattern image) emphasizing a feeling, the above-mentioned image processing may also be executed on the side of the terminal 30 or 40. When the above-mentioned image processing is executed on the side of the terminal 30 or 40, the image processing pattern and the like are set on the side of the terminal 30 or 40 in advance.

As described above, all of the above-mentioned modification pattern processing may be automatically executed on the basis of the voice data recognition and the extraction of data of a face from the captured image, or an operator may perform the processing through inputting with the manipulation key or the like in accordance with an instruction from a customer.

Also in the case where the modification pattern processing is executed on the side of the terminal 30 or 40, a software for executing the above mentioned image processing may be incorporated in the terminal 30 or 40 to automatically execute the image composition processing, or a customer may issue an instruction to the terminal 30 or 40 using keys/buttons or the like during the image capturing to request the execution of the composition processing.

The modification patterns used in the present invention comprise modification data including image data of a modification pattern image such as a mark emphasizing a feeling or the like and modification voice data, and a composition processing pattern thereof, and hence refer to a processing program for executing the whole series of processing which include composing the modification pattern image with a transmission image and particularly a related image included therein such as a captured image to produce a composite image and outputting the thus produced composite image. The processing program includes a plurality of processing modules and in particular image processing modules.

The image processing modules include, for example, various modules for extracting a face, face elements (eyes, nose, mouth, ears or the like), hair, body and the like, and processing modules for executing computation for shape pattern matching, density/color conversion, scaling, rotation, movement, size normalization and image composition. In addition, the processing modules may include a voice processing module. Note that the processing program may be an original program prepared by a person in communication and a relay service provider of the relay center 50 on their own.

The relay center 50 preferably retains the image processing modules with high communality in the form of a group of common modules stored in the server, for example database 54 of the relay center 50.

Examples of the modification data include image data forming elementary marks as shown in FIG. 4 (amount of movement on a time series basis is also included in a moving picture pattern), keyword parameters such as word or gesture patterns corresponding to the respective modes in the table shown in FIG. 4, composition pattern parameters such as a relative position to a face, a size and an orientation as shown in FIG. 4, and voice data of effective sound. The modification data may of course be modification image data or modification voice data prepared by a person in communication and a relay service provider of the relay center 50 on their own.

The relay center 50 preferably retains the modification data to be used as the modification patterns provided by a relay service provider or the like in advance in the form of a group of common data stored in the server, for example, the database 54 of the relay center 50.

Figure 8:
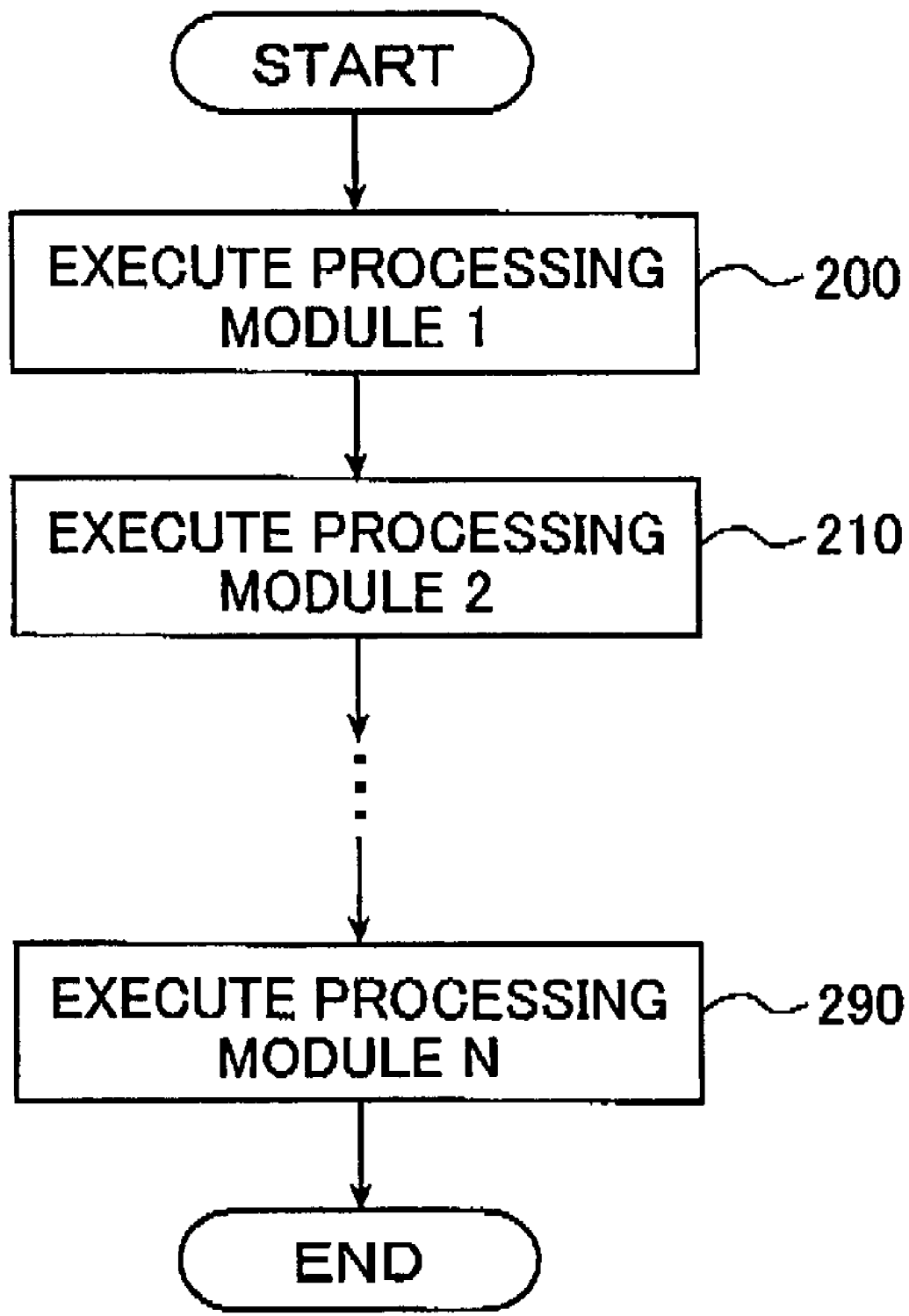
FIG. 8 is a flow chart for explaining an embodiment of a method for reproducing a modification pattern of a transmission image according to the present invention.

When a modification pattern including a plurality of processing modules is used to modify a transmission image in the present invention, these processing modules need only be sequentially executed as shown in FIG. 8 to execute the modification pattern for the modification processing (image composition processing in this embodiment). In other words, as shown in FIG. 8, the execution of a modification pattern is started from Step 200 executing Processing Module 1, which is followed by Step 210 executing Processing Module 2. Then, processing modules are sequentially executed, and Processing Module N is executed in Step 290 before the end of the execution of the modification pattern.

Figure 9:
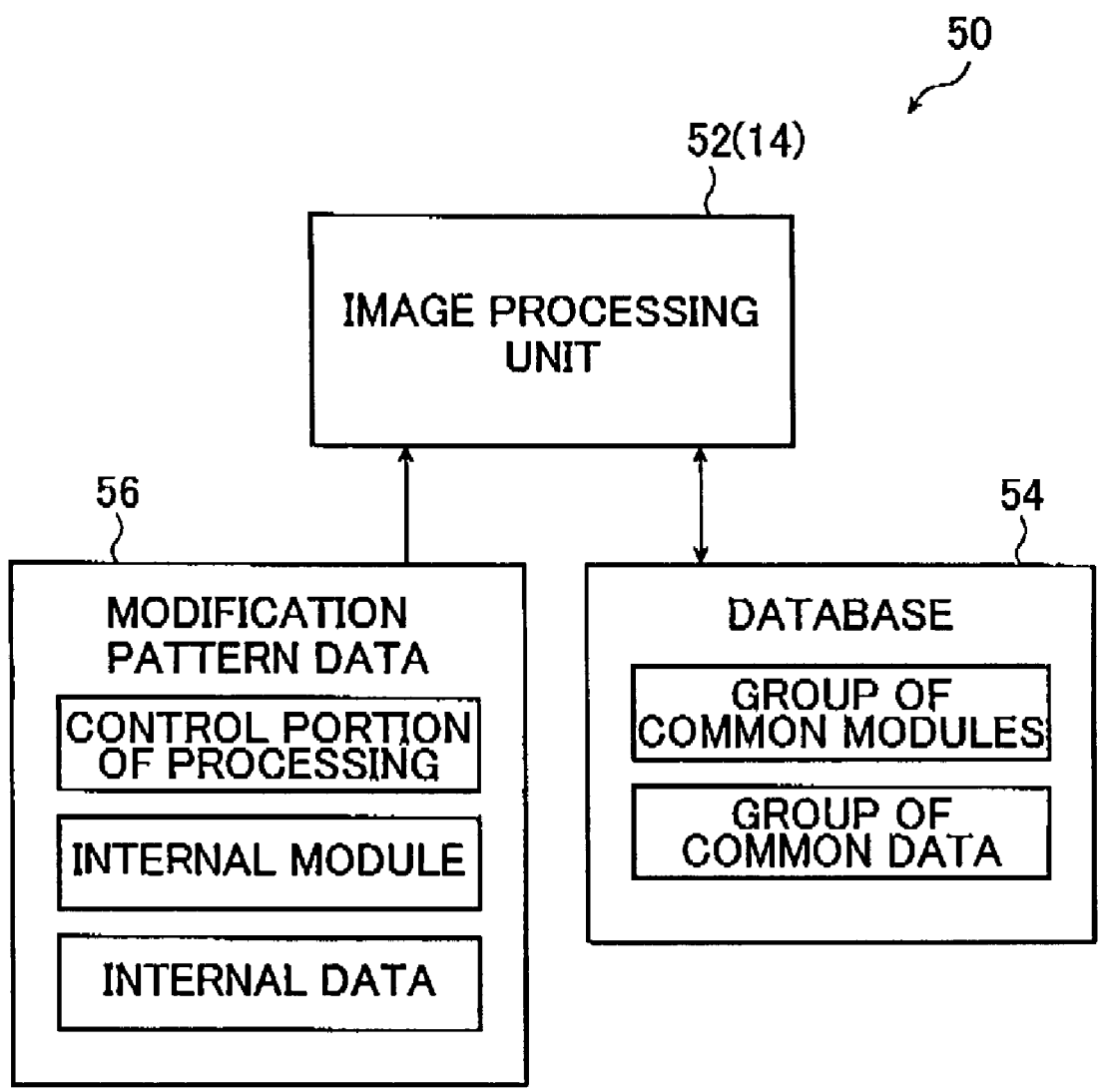
FIG. 9 is a block diagram showing an embodiment of an apparatus for reproducing a modification pattern of a transmission image according to the present invention.

When the modification pattern including a plurality of processing modules is executed as described above, two structures described below are possible. A typical case in which a modification pattern including a plurality of processing modules is executed or reproduced for example in the image processing unit 52 (see, for example, the image processor 14 whose layout is shown in FIG. 2) of the relay center 50 as shown in FIG. 9 will be described below.

A first structure takes a form in which programs of all the processing modules to be executed are retained as internal modules in an internal memory 56 of the image processing unit 52 so that all the processing modules can be executed individually. In this form, it is preferable that all the modification data for use in all the internal modules are also retained as internal data in the memory 56 of the image processing unit 52. This form is applied to the case where an original processing module, and an original program and original modification data thereof are used. This form can be preferably applied because it is not necessary to read out the program from the database 54, which enables immediate execution of the program of the processing module. However, the necessity for retaining the programs of all the processing modules increases the volume of the data to be retained. It should be noted here that the control portion of processing in the memory 56 is a portion in which a processing sequence for all the processing modules necessary for execution (these modules are all internal modules in this case) and a method of using modification data are described and which is called up to the image processing unit 52 to be used for execution and control.

A second structure takes a form in which programs of all the processing modules are executed by storing the group of common modules as described above in the database 54 of the relay center 50 while retaining no programs for the processing modules to be executed in the memory 56 of the image processing unit 52 of the relay center 50 and calling up to the image processing unit 52 all the processing modules to be executed from the group of common modules stored in the database 54, or by retaining part of the processing modules to be executed (for example, programs of only the processing modules which are not included in the group of common modules) in the memory 56 of the image processing unit 52 as internal modules and calling up specific other processing modules to the image processing unit 52 from the group of common modules stored in the database 54. This form is advantageous in that the volume of the data to be retained can be reduced to the lowest possible level due to the fact that the memory 56 of the image processing unit 52 retains no programs for all the processing modules or only a part thereof. To be more specific, a basic or technical image processing module addressing extraction of a face is not prepared by a user such as a person in communication, but a processing module provided by a relay service provider can be called up from the group of common modules stored in the database 54 of the relay center 50 and utilized.

It is of course preferable in this second form that the modification data used in the processing modules included in the group of common modules are also retained in the database 54 as the group of common data as described above. The modification data used in all the processing modules to be called up from the group of common modules in the database 54 or in the other processing modules than the internal modules in the memory 56 of the image processing unit 52 are also utilized by being called up to the image processing unit 52 from the group of common data in the database 54. It is preferable that the modification data used in the internal modules retained in the memory 56 of the image processing unit 52 is also retained in the memory 56 as the internal data. Further, the control portion of processing which describes the processing sequence of the processing modules and the like is called up from the memory 56 to the image processing unit 52 where this portion is used to execute and control all the processing modules, no matter whether all the processing modules to be executed are called up from the group of common modules in the database 54 or some of them are called up from the internal modules of the memory 56 and the others from the group of common modules.

In addition, while in the above-mentioned embodiment, the captured image is composed with a modification pattern image (an image or a mark) as the modification pattern emphasizing a feeling to produce the image composition pattern as described above, an expression may be changed through the morphing processing. For example, in the case of "ANGER" as a mode of modification pattern, the processing for providing an angry look in his/her eyes, or so forth may be executed through the morphing processing. However, in order to enhance the amusement aspect of a photograph, somewhat comical expressions as shown in FIG. 4 are more amusing and thus more effective than changing to very realistic expressions.

As stated above, a modification pattern may not comprise any modification pattern image but the image processing program itself for transmission images.

While in the above-mentioned embodiment, a still picture is the object to be transmitted as the captured image, a moving picture may also be the object. While the moving picture used may be a moving picture such as an image displayed on a display screen of a mobile visual telephone or a displayed image of a movie in movie editing or the like, These moving pictures can also be basically subjected to the image composition processing method as in the above-mentioned embodiment.

That is, the same image processing patterns as those in the above-mentioned embodiment are registered in advance in a microcomputer as in a mobile visual telephone terminal (refer to the terminal 30 or 40 shown in FIG. 1) as modification patterns, and the image processing software is also incorporated therein. In the case of a mobile visual telephone, when a registered keyword is detected in the voice of the conversation during a call, image composition processing to produce a composite image in the mode corresponding to the detected keyword is executed in one of the terminals. Then, the composite image is transmitted to the other terminal and displayed therein.

At this time, the displayed composite image is a moving picture. Then, it is more effective if the mark such as "sweat mark" as shown in FIG. 4 does not remain still but is moved downward little by little for example.

Note that by ensuring sufficiently high arithmetic operation speed of a CPU, it is possible to execute the image processing in real time during a call using a mobile visual telephone or while reproducing the image in the movie editing.

In this embodiment as well, similarly to the above-mentioned embodiment, the image composition processing may be executed in a relay center (refer to the relay center 50 shown in FIG. 1) for mobile visual telephone terminals (refer to the terminals 30 and 40 shown in FIG. 1).

While in the above-mentioned embodiments, the voice data is used as the information to determine the kind of feeling of a person, the kind of feeling may be determined using the expression recognition or the gesture recognition instead of the voice data. Since also in this case, the invention is applied to mobile visual telephones or visual telephones, it is possible to execute the image composition processing in real time.

For the expression recognition, a table of correspondence-between images having expressions of one's feelings and modes corresponding to these expressions is registered for each individual in advance in his/her mobile visual telephone terminal. In addition, for the gesture recognition, a table of correspondence between gestures and modes as determined by each individual, for example, as to which mode corresponds to the gesture of lifting one finger, which mode corresponds to the gesture of lifting two fingers, and so forth is registered in advance in his/her mobile visual telephone terminal (refer to the terminal 30 or 40 shown in FIG. 1).

Then, during a call, in the mobile visual telephone terminal concerned, data of a face is extracted from the captured image of a speaker, and a kind of expression is identified on the basis of the pattern matching. Then, when the expression matching a specific expression which is registered in advance is detected, image processing for the image processing pattern of the mode corresponding to the registered expression is executed and then the processed image is transmitted to the terminal of the other party of the call and displayed therein. Alternatively, the same processing is executed also in the case where it is detected on the basis of the gesture recognition that a speaker is making a specific gesture.

In this embodiment as well, similarly to the above-mentioned embodiments, the image composition processing may be executed in a relay center (refer to the relay center 50 shown in FIG. 1) for mobile visual telephone terminals (refer to the terminals 30 and 40 shown in FIG. 1).

Further, as examples of a publicly known technology concerning expression recognition and gesture recognition, there are, for example, the technical research report dated Nov. 18 and 19, 1999 of the Institute of Electronics, Information and Communication Engineers, PRMU99-106 "Robust Gesture Recognition For Change of Gesture Position" Yoshimichi Amada, Motoyuki Suzuki, Hideaki Goto, Shozo Makino (Tohoku University), PRMU99-138 "Automatic Extraction of Facial Organs and Recognition of Facial Expressions" Hiroshi Kobayashi, Hisanori Takahashi, Kohki Kikuchi (Science University of Tokyo), PRMU99-139 "Detecting Human Face and Recognizing Facial Expressions Using Potential Net" Hiroaki Bessho (Laboratories of Image Information Science and Technology), Yoshio Iwai, Masahiko Yachida (Osaka University), PRMU99-140 (Special Lecture) "Research on the Recognition of Facial Expressions of Emotion and the Image Processing Technology" Hiroshi Yamada (Nihon University/ATR), PRMU99-142 (Special Invitation Thesis) "Human Motion Analysis and Recognition for Interaction" Masahiko Yachida, Yoshio Iwai (Osaka University), which are preferably applicable to the present invention.

In the above-mentioned various embodiments, it is preferable to correct a position of a composition pattern if a misregistration occurs when the image composition processing is performed on a real time basis.

Since most of misregistrations of a composition pattern are due to a failure in extracting a face, if a misregistration of a composition pattern is found on a display screen, a face in the captured image is designated by an electronic pen or the like. At this point, the outline of the face may be circled using the electronic pen, or the eyes may be connected by a line. Moreover, a position of the mouth or the like may be designated. Alternatively, a position to which the composition pattern should be shifted in parallel, an adjustment amount of a size or the like may be designated by key operation.

Thereafter, based on the corrected position and size of the composition pattern, a face position candidate area is automatically corrected to coincide with an original composition pattern, and the face extraction processing is executed again.

Thus, a position and a size of a composition pattern is corrected in accordance with a movement of a face on a real time basis even in a case of a moving picture as in a mobile visual telephone. Therefore, since a composition pattern automatically follows a face and is displayed at a predetermined position in a displayed image, amusement aspect of an image display in an image displaying medium is enhanced.

In addition, the TV image may be captured in the personal computer and subjected to the composition processing described above. Alternatively, a digital TV may have a receiver including the above-mentioned composition processing function so that a customer can further set composition patterns. Amusement aspect can be thus enhanced still more.

A mobile visual telephone system to which the method of the present invention is applied, and a modification pattern selection and composition processing apparatus for use therein are basically configured as described hereinabove.

Next, a first embodiment of the present invention will be described below with reference to FIG. 5.

This embodiment refers to the case in which when a favorite modification pattern is found in an image transmitted by the other party in communication which is displayed on an image display unit of his/her communication device during a call or communication in the above-mentioned mobile visual telephone system (including the modification pattern selection and composition processing apparatus 10 shown in FIG. 2), this modification pattern can be copied to additionally register in his/her library.

As described above, an image modification pattern in the terminal 30 or 40 with an image capturing function (camera), e.g., an image modification pattern corresponding to voice, a gesture or an expression is first registered for example in the form of the table shown in FIG. 4 in the database 54 for each customer in the mobile visual telephone system shown in FIG. 1.

Figure 5:
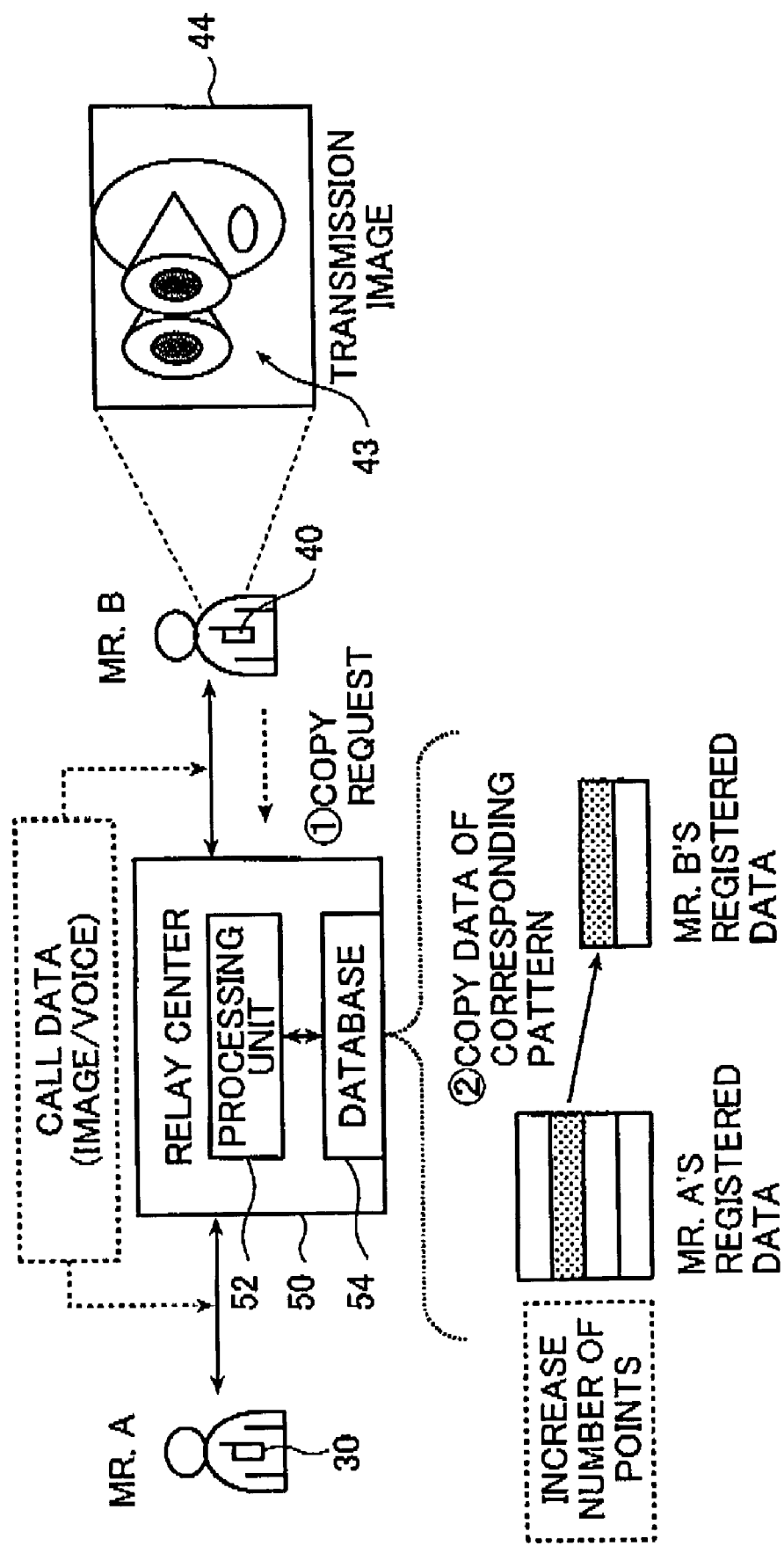
FIG. 5 is a diagram useful in explaining a first embodiment of a method of registering a modification pattern of a transmission image according to the present invention.

Next, as shown in FIG. 5, Mr. A and Mr. B start to communicate with each other through the relay center 50 using their terminals 30 and 40. Then, for example as described above, during the communication, Mr. B as the other party in communication receives, from Mr. A as a person in communication, a composite image which has been produced in the relay center 50 by composing the captured image with the modification pattern image corresponding to voice, a gesture, or an expression and displays the received composite image on the display screen of the image display unit 44 of the terminal 40 as a transmission image 43. At this time, modification pattern identification information (modification pattern ID) is added to the transmission image (composite image) 43 which was modification-processed.

At this time, when Mr. B as the other party B in communication finds that the modification pattern or its modification image on the transmission image 43 sent from Mr. A as a person in communication and displayed on the display screen of the image display unit 44 of his terminal 40 is interesting and wants to add to his own modification patterns, it is possible to copy the modification pattern of the transmission image 43 for example by pressing a pattern copy key (not shown) or inputting pattern copy data, which is as shown in FIG. 5. That is, copy request data used to copy the modification pattern is produced by pressing a pattern copy key or inputting pattern copy data in the terminal 40. Modification pattern identification information is cut out from the transmission image 43 received from Mr. A as a person in communication to be included in the copy request data together with the customer ID of Mr. B. It is preferable that the customer ID of Mr. A as a possessor of the modification pattern is also included in the copy request data. The copy request data thus produced is sent from the terminal 40 of Mr. B to the relay center 50.

In the relay center 50 which has received the copy request data from the terminal 40 of Mr. B, by means of the processing unit 52, the modification pattern is retrieved from the database 54 provided in the center using the modification pattern identification information and optionally the customer ID so that the corresponding (hit) modification pattern is read out of the storage area of Mr. A and written in the storage area of Mr. B. The relay center 50 thus copies the modification pattern data (the program and the reference data (image/voice)) between the customers concerned, i.e., it is copied from the storage area of Mr. A to the storage area of Mr. B. In such a manner, the modification pattern concerned is additionally included in the registration data of Mr. B (or registered in the library of the storage area).

Therefore, in this example, the processing unit 52 of the relay center 50 functions as a means for reading a modification pattern from contents including modification patterns and copying the read modification pattern, the database 54 as a means for registering the copied modification pattern, and the relay center 50 as an apparatus for registering a modification pattern of a transmission image.

If the modification pattern identification information has been cut out from the transmission image 43, then the timing at which the copy request data is transmitted from the terminal 40 of Mr. B to the relay center 50 and the timing at which the processing for copying the modification pattern data is executed in the relay center 50 which has received the copy request data do not need to be set during the call or the communication between both of the persons in communication.

In this embodiment, a person (Mr. A) whose modification pattern was copied by another person (Mr. B) preferably receives some profit return in accordance with the number of times the modification pattern was copied, or the number of times the modification pattern was used during a call (communication). Examples of the profit return include return of the charge for a telephone call (discount or reduction) and commendations. At this time, the total count for the number of times the modification pattern was copied or used is preferably managed in the relay center 50 for each customer or for each modification pattern.

On the other hand, instead of the profit return, the copy of a modification pattern or the use of the copied modification pattern may be made chargeable for each modification pattern or collectively.

To the contrary, copy prohibition can be also preferably set for each modification pattern or collectively depending on a customer or a modification pattern.

In this connection, the copy of a modification pattern between a person in communication and a third person is also possible. The profit can be returned to a producer on the basis of producer identification information attached to the modification pattern. For example, also in the case where a modification pattern is copied from the terminal of Mr. B to the terminal of Mr. C, the frequency of utilization of the modification pattern is counted up for the producer A.

Next, a second embodiment of the present invention will be described below with reference to FIG. 6.

This embodiment refers to the case in which when a person takes a look at a special effect scene which is being displayed on a display screen of an image display apparatus such as a television, and when he/she likes this special effect scene, he/she can additionally include this special effect scene in the form of a modification pattern in his/her registration data (or registered in the library).

Figure 6:
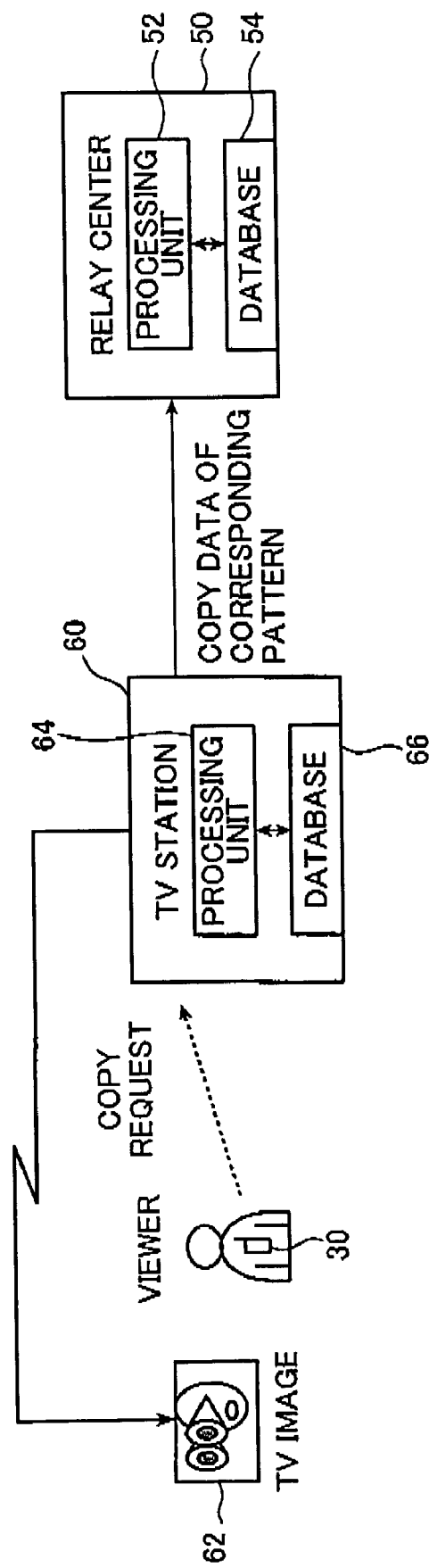
FIG. 6 is a diagram useful in explaining a second embodiment of a method of registering a modification pattern of a transmission image according to the present invention.

As shown in FIG. 6, in the case where when a TV viewer as a possessor of the terminal 30 takes a look at a special effect scene of a television image 62 and when he/she likes the special effect scene, he/she requests a television station 60 to copy the special effect scene using the terminal 30. That is, copy request information containing a customer ID, frame identification information (frame ID)(a program channel, time and the like) of the special effect scene of the television image 62, a telephone number and the like is transmitted from the terminal 30 to the television station 60.

The television station 60 which has received the copy request information from the customer carries out, by means of a processing unit 64, the retrieval in a database 66 on the basis of the frame identification information to read out data of a modification pattern in the image of the corresponding special effect scene, the data then transmitted as the image modification pattern data together with the customer ID to the relay center 50 for the terminal 30 which is identified on the basis of the customer ID, the telephone number and the like.

In the relay center 50, by means of the processing unit 52, the received image modification pattern data is written to copy and thereby stored in a customer storage area of the database 54 provided in the center. In such a manner, the modification pattern concerned is additionally included in the registration data of a viewer (registered in the library of the storage area).

At this time, when additionally registering the modification pattern concerned, individual viewers may allocate keywords (language) for extraction of the modification pattern taken from a television or the like from the database 54.

When a charge is applied for taking a modification pattern from a television or the like in the database 54, it is preferable that this charge is added to the charge for a telephone call (including the charge for telephone communication) and is paid to the television station 60 via the relay center 50.

While a copy request is made in this embodiment by transmitting copy request information from the terminal 30 of a viewer to the television station 60, the present invention is not intended to be limited thereto. That is, a copy request signal may be transmitted from the terminal 30 of a viewer to the relay center 50 to make a copy request for a special effect scene of the television image 62.

In this case, first of all, a viewer transmits the above-mentioned copy request signal containing the frame identification information of the special effect scene of the television image 62 from his/her terminal 30 to the relay center 50. The relay center 50 and the television station 60 communicate with each other to carry out information exchange between the frame identification information of the special effect scene and the image data together with the processing program thereof (image modification pattern data) of the special effect scene so that the image modification pattern data is stored in the customer storage area of the database 54 in the relay center 50. In such a manner, the modification pattern concerned is additionally included in the registration data of a viewer (registered in the library of the storage area).

When the television station 60 transmits the modification pattern data whose copy was requested to the relay center 50, the modification pattern in itself may not be transmitted but its identification information (ID) only if the modification pattern has once been transmitted to the relay center 50 in line with the copy request from another viewer or the like.

For instance, the television station 60 records the identification information with respect to the modification patterns already transmitted. Whenever receiving a copy request, the television station 60 tries to retrieve the identification information of the corresponding modification pattern from the recorded information and transmits the modification pattern data to the relay center 50 if the modification pattern has not been transmitted to the relay center 50 yet. Alternatively, whenever receiving a copy request, the television station 60 initially transmits the identification information of the corresponding modification pattern to the relay center 50 and then transmits the modification pattern data in itself to the relay center 50 only if the modification pattern is not found out in the relay center 50.

Such measures as above have an effect of omitting a data transmission of no use.

In the example as described above, the special effect scene of a television image whose copy is to be requested is designated by the frame identification information (frame ID) such as the program channel and the airtime to obtain and copy the corresponding modification pattern, although the present invention is not intended to be limited thereto. Any method may be used for the scene designation so long as the scene of interest can be designated by it and the information concerning the modification pattern of a designated scene may be obtained by any possible method.

For instance, the scene designating method disclosed in JP 10-171027 A, the published patent application filed by the applicant common to the present application, may be used. In this scene designating method, a broadcast station adds frame identification information, which is provided by encoding a combination of the name of the broadcast station, the program title, the broadcasting date and time, and the image frame number, to individual scenes and the frame identification information of the scene of interest is decoded on the television set's side. The frame identification information thus decoded may be transmitted to the broadcast station as that of the designated scene so as to obtain the modification pattern data (information) of the scene of interest.

A modification pattern itself or its identification information may be obtained by the scene designating method provided in the specification of the Japanese Patent Application No. 2001-322392 filed by the applicant common to the present application (disclosed in JP 2002-305717 A), wherein the information attached to a scene is received directly from the television.

It is also possible to use the scene designating method provided in the specification of the Japanese Patent Application No. 2002-281462 filed by the applicant common to the present application, wherein a scene of the television image being displayed on the screen of a television set is captured with a camera and the captured image is sent to the broadcast station concerned so as to request the broadcast station to identify the scenes the modification pattern data (information) of the scene of interest being thus obtained.

It should be noted that, in this example, television broadcasts may be terrestrial or satellite broadcasts, or again, may be Internet broadcasts, each in the moving or still picture mode.

Next, a third embodiment of the present invention will be described below with reference to FIG. 7.

This embodiment refers to the case in which the modification pattern composition processing and the registration of a modification pattern are carried out on the side of the terminal 30 or 40, unlike the above-mentioned first and second embodiments which execute the modification pattern composition processing in the processing unit 52 of the relay center 50 and the registration of a modification pattern in the database data (library) in the database 54 provided in the relay center 50. In the case in which the modification pattern composition processing is executed on the side of the terminal 30 or 40, the copy request signal and the modification pattern data are transmitted between the both persons in communication.

Also in this case, as described above, a communication (call) is made between the terminals 30 and 40 through the relay center 50 in the mobile visual telephone system shown in FIG. 1, and modification patterns of transmission images are stored (registered) in the respective memories 38 and 48 of the terminals 30 and 40 of the customers.

Figure 7:
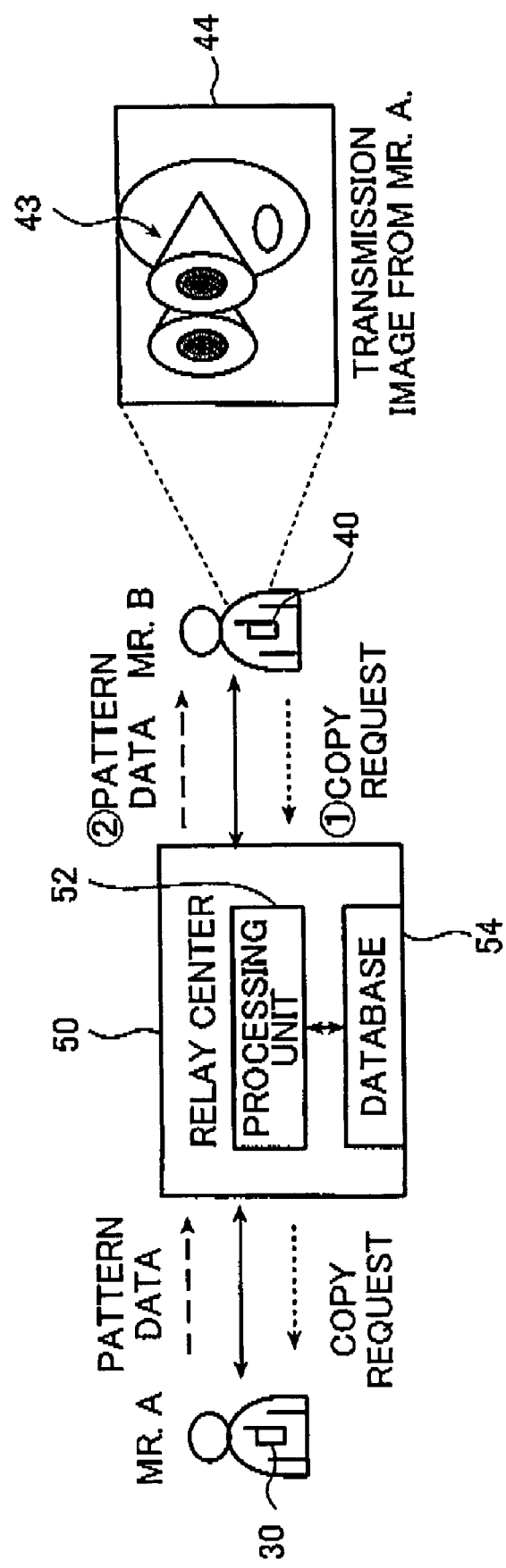
FIG. 7 is a diagram useful in explaining a third embodiment of a method of registering a modification pattern of a transmission image according to the present invention.

Then, as shown in FIG. 7, during the communication, for example, the terminal 40 of Mr. B as the other party in communication receives from the terminal 30 of Mr. A as a person in communication the composite image which has been produced in the terminal 30 by composing the captured image with the modification pattern image corresponding to voice, a gesture or an expression, and the composite image thus received in the form of the transmission image 43 is displayed on the display screen of the image display unit 44 of the terminal 40. At this time, the modification pattern identification information (modification pattern ID) is added to the modified transmission image (composite image) 43.

At this time, as shown in FIG. 7, when Mr. B as the other party in communication wants to add a modification pattern of the transmission image 43 sent from Mr. A as a person in communication to his registration data, for example, a request to copy a modification pattern of the transmission image 43 can be made from Mr. B as the other party in communication to Mr. A as a person in communication by pressing a pattern copy key or inputting pattern copy data.

For example, a processing unit 47 of the terminal 40 produces copy request data used to copy a modification pattern, cuts out modification pattern identification information from the transmission image 43 received from Mr. A as a person in communication and adds the modification pattern identification information to the copy request data together with the customer ID of Mr. B. The customer ID of Mr. A as a possessor of the modification pattern concerned is preferably also included in the copy request data. The copy request data thus produced is transmitted from the terminal 40 of Mr. B to the terminal 30 of Mr. A through the relay center 50.

Next, in the terminal 30 of Mr. A which has received the copy request data, by means of a processing unit 37 thereof, image data together with the processing program thereof (modification pattern data) of the corresponding modification pattern are read out from an internal memory 38 using the modification pattern identification information and optionally the customer ID. Then, the modification pattern data thus read out is sent from the terminal 30 of Mr. A back to the terminal 40 of Mr. B through the relay center 50.

Next, in the terminal 40 of Mr. B, the modification pattern data thus sent back thereto is stored in an internal memory 48. Thus, the modification pattern concerned is additionally included in the registration data in the storage area (or registered in the library of the storage area) of the internal memory 48 of the terminal 40 of Mr. B.

The timing at which the copy request data is transmitted from the terminal 40 of Mr. B to the terminal 30 of Mr. A, the timing at which the modification pattern data is read out in the terminal 30 of Mr. A having received the copy request data, and the timing at which the read out modification pattern data is sent back from the terminal 30 of Mr. A to the terminal 40 of Mr. B, and the like do not need to be set during a call or communication between both the persons in communication.

In the present invention, contents including modification patterns are not limited to transmission images on mobile visual telephones, television broadcast images, and so forth as described above but any contents are available from which a modification pattern can be obtained.

For instance, such contents as a commercial DVD may be possible in which modification pattern data is directly recorded together with image data and the modification pattern data thus recorded can be copied or, alternatively, information on a predetermined access site is recorded together with image data so that modification pattern data can be copied by accessing the site. In the latter case, a commercial DVD may be driven by a DVD driver etc. to reproduce image data and concurrently get information on a predetermined access site and then modification pattern data may be copied by accessing the site.

Moreover, hard copy media such as magazines may also be utilized as contents including modification patterns. In an exemplary case, a customer (person in communication) observing a hard copy medium such as a magazine, in which modification pattern images (sample images), modification pattern identification information (pattern IDs), and optionally samples of voice keywords are represented, may use a mobile telephone to input the pattern ID of the sample image which he/she likes and transmit it to a relay center. The relay center in itself may acquire the modification pattern data based on the inputted pattern ID to additionally include it in the registration data of the customer in a database. Again, the modification pattern data may further be transmitted from the relay center to the mobile telephone of the customer so as to register the data at the mobile telephone of the customer, namely on the communication terminal's side.

Furthermore, in the case of a video game machine, a predetermined scene in a video game such as a special effect scene may be designated on the video game machine so as to copy modification pattern data from the machine. Modification pattern data may be copied, for example, in a memory of a communication terminal or in a database of a relay center via the communication terminal.

It is also possible to receive a modification pattern provided by a theme park in a communication terminal when walking or passing through a gate in the theme park. The modification pattern received in the communication terminal may be copied, for example, in a memory of the communication terminal or in a database of a relay center via the communication terminal.

In the examples as described above, communication devices provided with image display units are used to carry out a communication in which voice is transmitted (sent and received) as well as a transmission image such as a captured image of a person and determine the kind of feeling of the person in the transmission image based on the communication voice data and the image of the person in the transmission image (namely, his/her expression, gesture, and so forth shown therein) so as to select as the modification pattern for modifying the transmission image such a modification pattern corresponding to the determined kind of feeling as emphasizing the feeling in question. The present invention is not limited to such a method of modification pattern control as above but may employ another one.

For instance, it is possible to set modification patterns in such a manner that they are switched from one to another depending on the other party in communication. In that case, various modification patterns may be set to one and the same keyword for various other parties in communication or, alternatively, "display (ON)/not display (OFF)" operation may be set depending on the other party in communication. It is also possible to allow modification patterns to automatically switch depending on the location or the time of day with respect to a person or the other party in communication.

Modification patterns for 3D (three-dimensional) display may also be employed. In that case, image processing is carried out corresponding to the displaying function of the communication terminal of the other party in communication to prepare images for two-dimensional or three-dimensional display.

The modification pattern control may be combined with the vibrating function of a mobile telephone.

In addition, a selected modification pattern may be edited. Edition of modification patterns is preferably carried out with respect to the size, position, displaying period, timing of emergence, and the combination of two or more patterns (the order or timing of emergence etc.).

If various modification patterns are presented by various relay service providers and specialized dealers, it is preferable that a predetermined toll is paid the provider or dealer presenting the modification pattern which was used, paid according to the frequency in use of the pattern in question. Preferably, toll collection from customers is carried out directly by relay service providers and subsequently distributed to other dealers.

It is also possible to indicate in the image, to which a modification pattern presented by a relay service provider or a specialized dealer is applied, that the toll on the modification pattern is collected.

While in the above-mentioned embodiments, an image captured with a mobile visual telephone terminal having an image capturing function is composed with a modification pattern image as a modification pattern, which is corresponding to the contents of a call made through the voice data or the contents of the captured image to be transmitted, to thereby display the resultant composite image (image composite pattern) on the terminal of the other party in communication, the present invention can be applied not only to the case of a call through voice data but also to the case of communication through character information. For example, a modification pattern may be selected in accordance with the contents of character information being transmitted so that the character information can be composed with a portrait of a person in communication, a captured image, animal symbols in Oriental Zodiac, a line drawing characterizing a person in communication, or other related image, each as a modification pattern image, and the resultant composite image can be displayed on a terminal of the other party in communication.

Now, communication equipment including an image display unit to which the method of the present invention is applied is not particularly limited, and hence any apparatus may be used as long as it has an image display device and a communication device for voice and/or character information. In addition to the above-mentioned mobile visual telephone terminal, examples of the communication equipment include communication devices with a display such as a fixed telephone with a display (or a parent telephone), a portable telephone with a display (or a child telephone), a visual telephone, a mobile telephone with a display, a movable telephone with a display, and a wireless device with a display. Then, each of the communication equipment described above is preferably provided with an image capturing function, i.e., a camera function. Other examples thereof include image capturing apparatuses with a communication function for voice and/or character information, such as a video camera with a communication function, a digital camera with a communication function, and a digital video movie with a communication function. The communication equipment provided with an image display unit may be either one in which an image display device is integrated with a communication device into one unit, or one in which these devices are separately constructed and then coupled to each other.

By the way, the relay center and the database include a distributed system as well. While the drawings show the relay center in the form of one building, it is to be understood that the building also refers to the whole system in which a plurality of relay facilities and a plurality of database facilities are linked through a network.

Further, instead of a program and image data themselves, the modification pattern data to be copied to each customer's database may also be the data indicating the destination of reference of the original data of the modification pattern. In this case, during the image processing, the data is cited from the destination of reference thereof. This is effective for capacity reduction within a database.

Effective sound may also be outputted for the modification pattern in addition to the image composition. In this case, the modification pattern data includes voice data.

In addition, it is desirable that a customer can download software for producing original modification patterns from a relay service provider.

Furthermore, as the modification image data to be composed, either of a raster image (with a format containing information per pixel) and a vector image (with a format containing information about drawing graphics etc.) may be employed. Examples of the vector image format include the SVG format (see "NIKKEI ELECTRONICS", the issue published Sep. 23, 2002, pp. 169–178).

While the method and the apparatus for registering a modification pattern of a transmission image as well as the method and the apparatus for reproducing a modification pattern of a transmission image according to the present invention have been described above in detail by reference to various embodiments, it is to be understood that the present invention is not intended to be limited thereto, and hence various improvements and changes may be made without departing from the gist of the present invention.

As described above in detail, according to the present invention, a person in communication can copy for personal use the modification pattern that he/she likes from the contents including modification patterns for modifying a transmission image, which is displayed on the image display unit of a communication device during communication, and register it in a freely usable state. Specifically, for instance, a person in communication can transmit request information for requesting to copy for him/her an image modification pattern which he/she likes and chooses from among the image modification patterns sent from the other party in communication or a call, and a program or image data of the corresponding modification pattern, i.e., the modification pattern data concerned can be subjected to copying processing in a database of a relay center, or be copied to a memory in his/her communication device and registered in a freely usable state. Therefore, modification pattern data of his/her own can be increased to enrich the modification pattern data for him/her without taking time.

Consequently, according to the present invention, since the content which is desired to be emphasized in accordance with the feeling is automatically expressed in a visualized manner in an image displayed on an image display unit during communication or a call, in particular in a face of a person, the amusement aspect in the image expression can be greatly enhanced.

In addition, according to the present invention, in the case where the processing for copying a modification pattern(s) is executed in a database of a relay center, no substantial processing is performed on the side of a communication device terminal. Therefore, it is possible to reduce the load on a memory on the side of the communication device terminal.

Furthermore, according to the present invention, since it becomes possible to provide service to a person whose modification pattern(s) has (have) been copied, the service in accordance with the total number of times the modification pattern(s) has (have) been copied or used, it is possible to enhance the pleasure of creating original modification patterns.

What is claimed is:

1. A method of registering a modification pattern of a transmission image, comprising the steps of:

reading out contents associated with said modification pattern modifying the transmission image to be displayed on a second image display unit of a second communication device when a first communication device including a first image display unit of a first person in communication is communicating with the second communication device including the second image display unit of a second person in communication through a relay center;

copying said modification pattern from the thus readout contents; and registering the thus copied modification pattern in such a manner that said first person in communication or said first communication device is capable of using said modification pattern, wherein said modification pattern modifies a related image related to said first person in communication within said transmission image.

2. The method of registering the modification pattern of the transmission image according to claim 1, wherein said modification pattern includes image information, voice information or both and a program that reproduces the image information, the voice information or both, or a program that processes the transmission image.

3. The method of registering the modification pattern of the transmission image according to claim 1, wherein said contents include a transmission image from the second communication device which is displayed on the first image display unit of the first communication device communicating with the second communication device, and said copied modification pattern is a modification pattern modifying the transmission image from the second communication device that is reproduced and displayed on the first image display unit of the first communication device communicating with the second communication device and is registered in a database of the relay center or in a first memory of the first communication device, or is transmitted from the relay center to the first communication device to be registered in the first memory in association with related information related to the first person in communication or to the first communication device.

4. The method of registering the modification pattern of the transmission image according to claim 3, wherein
said modification pattern is registered in advance in the form of modification pattern data in association with the related information in the database of the relay center,
an identification number of the reproduced modification pattern is added to the transmission image displayed on the first image display unit,
said first communication device cuts out the identification number of the modification pattern from the transmission image displayed on the first image display unit to transmit copy request data containing the thus cut-out identification number of the modification pattern to the relay center, and
said relay center that has received the copy request data retrieves the modification pattern which is registered in the database in advance in association with the related information related to the second person in communication or to the second communication device from the identifying number of the modification pattern to add and register the thus retrieved modification pattern into the database in association with the related information related to the first person in communication or to the first communication device.

5. The method of registering the modification pattern of the transmission image according to claim 3, wherein
said copied modification pattern is counted whenever it is copied or used, and
said possessor of the second communication device receives an offer of service in correspondence to the number of counts.

6. The method of registering the modification pattern of the transmission image according to claim 3, wherein
said modification pattern is registered in advance in the form of modification pattern data in the second memory,
an identification number of the reproduced modification pattern is added to the transmission image displayed on the first image display unit,
said first communication device cuts out the identification number of the modification pattern from the transmission image displayed on the first image display unit to transmit copy request data containing the identification number of the thus cut-out modification pattern to the second communication device,
said second communication device that has received the copy request data reads out the modification pattern registered in the second memory from the identification number of the modification pattern to send the thus read out modification pattern data back to the first communication device, and
said first communication device adds and registers the modification pattern data thus received into the first memory.

7. The method of registering the modification pattern of the transmission image according to claim 3, wherein
said modification pattern is used to be composed with the related image to be displayed in the form of the transmission image in order to modify the related image related to the first person in communication within the transmission image, and
said copied modification pattern is a modification pattern composed within the transmission image from the second communication device, which is displayed on the first image display unit of the first communication device communicating with the second communication device.

8. The method of registering the modification pattern of the transmission image according to claim 1, wherein
said related image is a captured image of the first person in communication, and
said modification pattern represents a kind of feeling which is determined based on at least one kind of information selected from an expression and a gesture of the first person in communication extracted from the captured image, and voice data attached to the captured image.

9. The method of registering the modification pattern of the transmission image according to claim 1, wherein
said contents include a picture scene televised to an image display device and viewed by the first person in communication,
said copied modification pattern is picture information, voice information or both of a special effect scene within a televised image of the picture scene viewed by the first person in communication and a reproducing program therefor, and is registered in a database of the relay center or in a first memory of the first communication device in association with the related information related to the first person in communication or to the first communication device.

10. The method of registering the modification pattern of the transmission image according to claim 9, wherein
said modification pattern is registered in advance in the form of modification pattern data in the database of the relay center in association with the related information or in a database of a resource of the televised image,
an identification number of a scene frame is added to the televised image in the image display device,
copy request data containing the identification number of the scene frame is transmitted from the first communication device to the resource which supplies the televised image to the image display device, and
said resource that has received the copy request data retrieves the televised image of the special effect scene with the identification number of the scene frame to add and register the modification pattern in the televised image of the special effect scene thus retrieved in the form of the modification pattern into the database of the relay center in association with the related information related to the first person in communication or to the first communication device.

11. The method of registering the modification pattern of the transmission image according to claim 9, wherein
said modification pattern is registered in advance in the form of modification pattern data in the database of the relay center in association with the related information or in the form of modification pattern data in a database of a resource of the televised image,
an identification number of a scene frame is added to the televised image in the image display device,
copy request data containing the identification number of the scene frame is transmitted from the first communication device to the relay center,
said relay center that has received the copy request data transmits the copy request data to the resource, and
said resource that has received the copy request data retrieves the televised image of the special effect scene with the identification number of the scene frame to add and register the modification pattern in the televised image of the special effect scene thus retrieved in the form of the modification pattern into the database of the relay center in association with the related information related to the first person in communication or to the first communication device.

12. The method of registering the modification pattern of the transmission image according to claim 9, wherein:
said modification pattern is used to be composed with the related image to be displayed in the form of the transmission image in order to modify the related image related to the first person in communication within the transmission image, and
said copied modification pattern is a modification pattern for the televised image of the special effect scene televised to the image display device.

13. The method of registering the modification pattern of the transmission image according to claim 1, wherein
said copied modification pattern is registered in a database of said relay center or in a first memory of said first communication device in association with related information related to said first person in communication or to said first communication device.

14. The method of registering the modification pattern of the transmission image according to claim 1, wherein
said contents include a transmission image from the second communication device, which is displayed on the first image display unit of the first communication device communicating with the second communication device, and
said copied modification pattern is a modification pattern modifying the transmission image from the second communication device, that is reproduced and displayed on the first image display unit of the first communication device communicating with the second communication device.

15. The method of registering the modification pattern of the transmission image according to claim 1, wherein
said contents include a picture scene televised to an image display device and viewed by the person in communication, and
said copied modification pattern is predetermined picture information, voice information or both within the picture scene being viewed by the first person in communication and a reproducing program therefor.

16. The method of registering the modification pattern of the transmission image according to claim 1, wherein
said contents include a picture recording medium viewed by the first person in communication, and
said copied modification pattern is picture information, voice information or both within a reproduced picture reproduced from the picture recording medium and viewed by the first person in communication and a reproducing program therefor.

17. The method of registering the modification pattern of the transmission image according to claim 16, wherein:
said picture recording medium is a picture data recording medium on which at least the picture information is recorded in the form of picture data, and
said modification pattern is recorded on the picture data recording medium in the form of modification pattern data and is copied from the picture data recording medium or is copied from an accessing destination by using identification information of the accessing destination recorded on the picture data recording medium.

18. The method of registering the modification pattern of the transmission image according to claim 16, wherein:
said picture recording medium is a hardcopy medium to display at least the picture information in the form of hardcopy image and contains the picture information of the modification pattern and its identification information, and
said modification pattern is copied from a predetermined accessing destination in the form of modification pattern data by using the identification information of the modification pattern displayed on the hardcopy medium.

19. The method of registering the modification pattern of the transmission image according to claim 18, wherein
said modification pattern is copied from the predetermined accessing destination at the relay center side based on the identification information of the modification pattern which is transmitted from the first communication device to the relay center, and is registered into the database of the relay center in association with the first person in communication.

20. The method of registering the modification pattern of the transmission image according to claim 1, wherein said first and second communication devices are each a communication device having an image photographing function.

21. An apparatus for registering a modification pattern of a transmission image, comprising
reading means for reading out contents associated with a modification pattern modifying the transmission image to be displayed on a second image display unit of a second communication device when a first communication device including a first image display unit of a first person in communication is communicating with the second communication device including the second image display unit of a second person in communication through a relay center;
copying means for copying said modification pattern from the contents read out by said reading means; and
storing means for registering and storing said modification pattern copied by said copying means in such a manner that said first person in communication or said first communication device is capable of using said modification pattern,
wherein said modification pattern modifies a related image related to said first person in communication with said transmission image.

22. The apparatus for registering the modification pattern of the transmission image according to claim 21,
wherein said storing means is a database of the relay center or a first memory of the first communication device to store the copied modification pattern in association with the related information in related to the first person in communication or to the first communication device thereof.

23. The apparatus for registering the modification pattern of the transmission image according to claim 21,
wherein said registering apparatus is a server of the relay center or the first communication device.

24. The apparatus for registering the modification pattern of the transmission image according to claim 21, wherein said communication device is a mobile telephone having an image photographing function.

25. A method of reproducing a modification pattern of a transmission image, comprising the steps of:
reading out contents associated with said modification pattern modifying the transmission image to be displayed on a second image display unit of a second communication device when a first communication device including a first image display unit of a first person in communication is communicating with the second communication device including the second image display unit of a second person in communication through a relay center;

copying said modification pattern from the thus read out contents;

registering the thus copied modification pattern in such a manner that said first person in communication or said first communication device is capable of using said modification pattern;

reading out by the first communication device said modification pattern registered by means of said registering step; and reproducing and displaying said readout modification pattern on the first image display unit of the first communication device, the second image display unit of the second communication device or an image display device of the relay center, wherein said modification pattern modifies a related image related to said first person in communication within said transmission image.

26. The method of reproducing the modification pattern of the transmission image according to claim 25, wherein said transmission image transmitted from the first communication device and displayed on the second image display unit of the second communication device is modified by said modification pattern to be displayed.

27. An apparatus of reproducing a modification pattern of a transmission image, comprising first reading means for reading out contents associated with a modification pattern modifying the transmission image to be displayed on a second image display unit of a second communication device when a first communication device including a first image display unit of a first person in communication is communicating with the second communication device including the second image display unit of a second person in communication through a relay center;

copying means for copying said modification pattern from the contents read out by said reading means;

storing means for registering and storing said modification pattern copied by said copying means in such a manner that said first person in communication or said first communication device is capable of using said modification pattern;

second reading means for reading out said modification pattern registered by said storing means and provided in the first communication device; and reproducing means for reproducing and displaying said read-out modification pattern on the first image display unit of the first communication device, the second image display unit of the second communication device or an image display device of the relay center, wherein said modification pattern modifies a related image related to said first person in communication within said transmission image.

28. The apparatus for reproducing the modification pattern of the transmission image according to claim 27, wherein said second communication device displays the transmission image modified by said modification pattern and transmitted to the second image display unit thereof from the first communication device.

* * * * *